(12) United States Patent
Kudo

(10) Patent No.: US 8,455,809 B2
(45) Date of Patent: Jun. 4, 2013

(54) SOLID-STATE IMAGING DEVICE, IMAGING DEVICE AND DRIVING METHOD OF SOLID-STATE IMAGING DEVICE

(75) Inventor: Shigetaka Kudo, Kanagawa (JP)

(73) Assignee: Sony Corporation, Tokyo (JP)

(*) Notice: Subject to any disclaimer, the term of this patent is extended or adjusted under 35 U.S.C. 154(b) by 376 days.

(21) Appl. No.: 12/993,144

(22) PCT Filed: Mar. 13, 2009

(86) PCT No.: PCT/JP2009/054949
§ 371 (c)(1),
(2), (4) Date: Nov. 17, 2010

(87) PCT Pub. No.: WO2009/144993
PCT Pub. Date: Dec. 3, 2009

(65) Prior Publication Data
US 2011/0062310 A1   Mar. 17, 2011

(30) Foreign Application Priority Data

May 30, 2008 (JP) ................................ 2008-142335

(51) Int. Cl.
*H04N 3/14* (2006.01)
*H04N 5/335* (2011.01)
*H01L 27/00* (2006.01)

(52) U.S. Cl.
USPC ........................................ 250/208.1; 348/308

(58) Field of Classification Search
USPC ........................................ 250/208.1; 348/308
See application file for complete search history.

(56) References Cited

U.S. PATENT DOCUMENTS

| 7,622,699 B2* | 11/2009 | Sakakibara et al. ....... 250/208.1 |
| 2002/0109160 A1 | 8/2002 | Mabuchi et al. |
| 2005/0224841 A1 | 10/2005 | Nakamura et al. |
| 2006/0146157 A1 | 7/2006 | Toros et al. |
| 2008/0266435 A1* | 10/2008 | Agranov et al. ............. 348/308 |

FOREIGN PATENT DOCUMENTS

| EP | 1 223 623 A2 | 7/2002 |
| JP | 2002-217397 | 8/2002 |
| JP | 2007-166240 | 6/2007 |
| JP | 2008-118571 | 5/2008 |
| JP | 2009-005285 | 1/2009 |
| WO | 03/085964 | 10/2003 |

OTHER PUBLICATIONS

European Search Report dated Apr. 18, 2012, in connection with counterpart EP Application No. 09 75 4501.

* cited by examiner

*Primary Examiner* — Thanh Luu
*Assistant Examiner* — Renee Naphas
(74) *Attorney, Agent, or Firm* — Dentons US LLP

(57) ABSTRACT

It is possible to achieve compatibility between suppressing dark current caused by a leak phenomenon and ensuring element reliability in a CMOS solid-state imaging device. When a pixel using electrons as signal charge is driven, the negative voltage level of each of control signals adapted to pulse-drive transistors in the pixel is adjusted so that the longer the charge accumulation time, the higher the voltage level. Preferably, the negative voltage level is grounded (GND) when no signal charge is accumulated. The negative voltage level is increased only when the charge accumulation time is long, which is the case where dark current caused by a leak phenomenon becomes a problem. Therefore, it is possible to suppress stress on the pixels and the gate oxide film of their drive circuits and degradation of the transistor characteristics even if dark current is suppressed.

16 Claims, 14 Drawing Sheets

F I G . 1
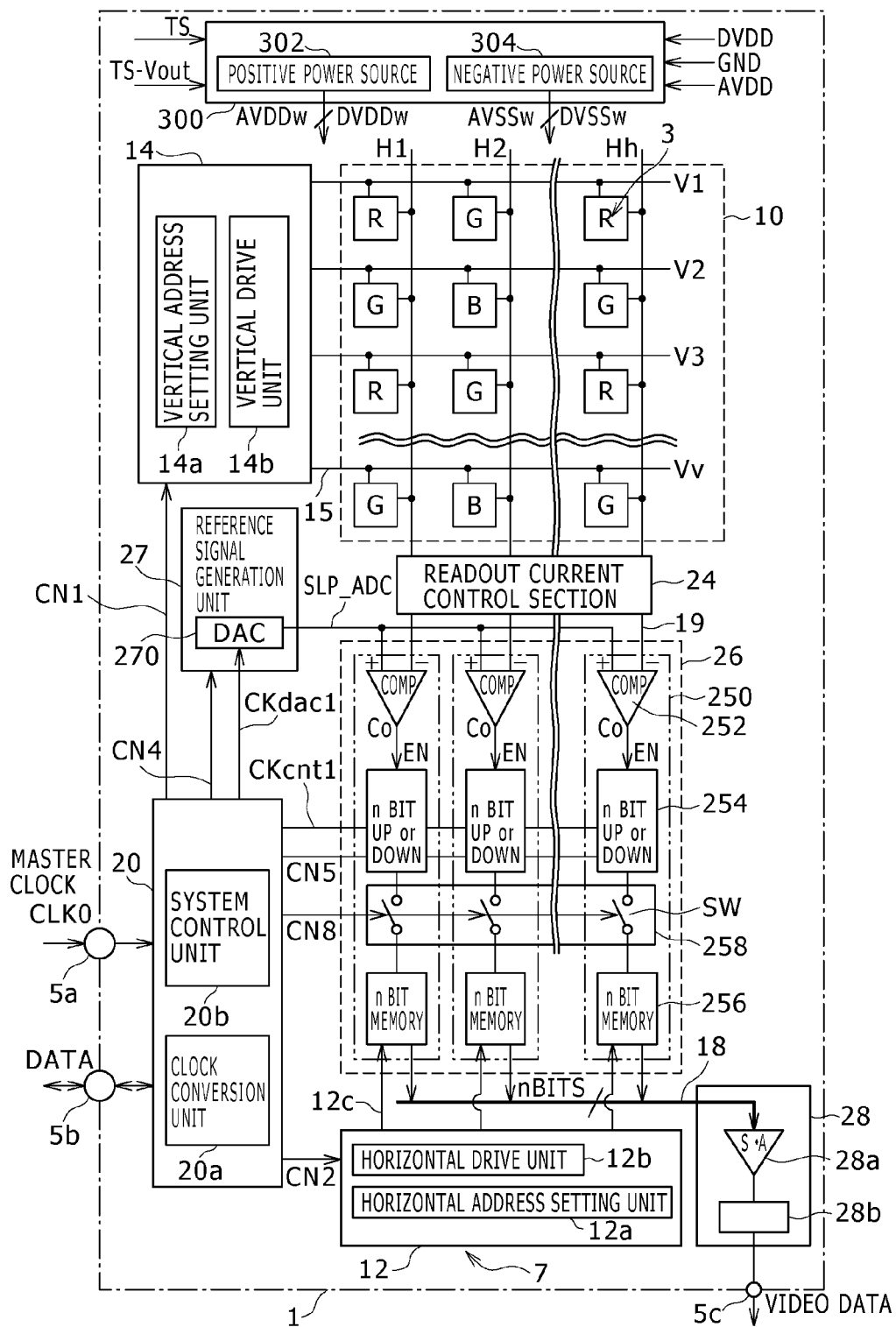

(1) 1ST EXAMPLE (2) 2ND EXAMPLE

F I G . 5
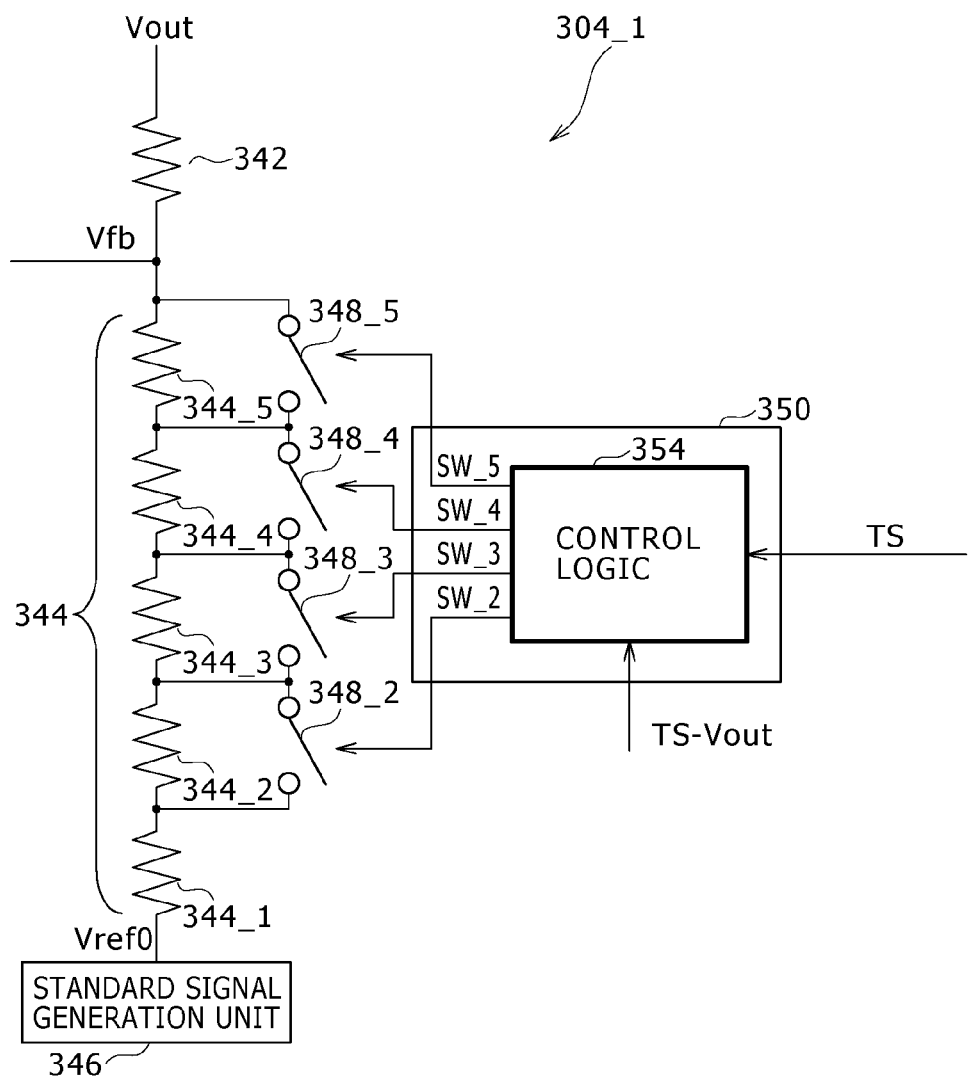

SOLID-STATE IMAGING DEVICE, IMAGING DEVICE AND DRIVING METHOD OF SOLID-STATE IMAGING DEVICE

TECHNICAL FIELD

The present invention relates to a solid-state imaging device, an imaging device and a driving method of the solid-state imaging device. More particularly, the present invention relates to a pixel driving technique suitable for semiconductor devices such as solid-state imaging devices for detecting physical quantity distribution and other electronic equipment which include an arrangement of a plurality of unit pixels sensitive to externally fed electromagnetic waves such as light and radiation, and from which a physical quantity distribution, converted into an electric signal by unit components, can be read out in the form of an electric signal through arbitrary selection by address control.

BACKGROUND ART

Semiconductor devices for detecting physical quantity distribution have found wide application in a variety of fields. Such devices have a plurality of unit components (e.g., pixels), sensitive to externally fed electromagnetic waves such as light and radiation, arranged in lines or in a matrix form.

In the field of video equipment, for example, CCD (Charge Coupled Device) or MOS (Metal Oxide Semiconductor) and CMOS (Complementary Metal Oxide Semiconductor) solid-state imaging devices are used. These devices are designed to detect light (an example of electromagnetic waves) among other physical quantities. Such devices allow a physical quantity distribution, converted into an electric signal by unit components (pixels in a solid-state imaging device), to be read out therefrom in the form of an electric signal.

Some solid-state imaging devices are amplifying devices. These devices include, in a pixel signal generation section, pixels configured as solid-state imaging elements (APSs: Active Pixel Sensors, also referred to as gain cells), each of which has an amplifying drive transistor. The pixel signal generation section generates a pixel signal commensurate with the charge of the signal generated by a charge generation section. For example, many of CMOS solid-state imaging devices are configured in such a manner.

In order to read out a pixel signal externally from such an amplifying solid-state imaging device, a pixel section having an arrangement of a plurality of unit pixels is address-controlled so that the signal from a unit pixel can be arbitrarily selected and read out. That is, an amplifying solid-state imaging device is an example of address-controlled solid-state imaging device.

A unit pixel includes a charge generation section and signal output section. The charge generation section generates a signal charge. The signal output section has a transistor adapted to generate and output a target signal which is commensurate with the signal charge generated by the charge generation section. For example, the charge generation section has a photodiode which performs photoelectric conversion. The signal output section has a readout selection transistor, amplifying transistor, reset transistor and selection transistor. The readout selection transistor reads out the signal charge generated by the photodiode. The amplifying transistor converts the read signal charge into a pixel signal. The reset transistor resets the signal charge. The selection transistor selects the pixel to be read out.

Here, MOS solid-state imaging devices have a dark current problem caused by a leak phenomenon in which the signal charge generated by the charge generation unit leaks out into the signal output side. If the signal charge is accumulated for long hours in particular, the dark current component increases cumulatively, thus accounting for a large proportion of the signal charge. The dark current component cannot be separated from the signal charge during readout. The variation therein results in noise, significantly degrading the image quality. For example, the variation in the dark current component from one pixel to another leads to fixed pattern noise, causing white dots to appear in the image. As a result, the image looks as if it was captured through ground glass. Further, the variation in the dark current component over time results in random noise. In the case of MOS solid-state imaging devices, therefore, it is a matter of concern how to reduce the dark current component.

As a countermeasure thereagainst, for example, Republished Patent Application No. WO2003/085964 proposes an arrangement for reducing dark current. The arrangement brings the voltage applied to the gate (referred to as the transfer gate) of the readout selection transistor to the ground potential or less, that is, applies a negative voltage to the transfer gate, thus accumulating holes in the transfer gate channel and providing reduced dark current.

However, if a negative voltage is used as described above, excessively lowering the negative voltage of the transfer gate, that is, negatively increasing the voltage of the transfer gate, results in more stress on the pixel and the gate oxide film of its drive circuit. Further, the transistor characteristics degrade, for example, due to hot carriers, significantly affecting the reliability (product life). On the other hand, increasing the negative voltage (negatively reducing the voltage) in consideration of reliability results in failure to prevent leaks, exacerbating noise caused by dark current in the case of long hours of accumulation. Thus, at present, both reliability and leak phenomenon cannot be met sufficiently. Therefore, it is difficult to optimize the negative voltage at a constant level.

Possible solutions to use a constant negative voltage level would be to increase the thickness of the gate oxide film of the transistors to which a negative voltage is applied and to enhance the reliability (durability). However, this leads to an increased number of manufacturing steps, thus resulting in increased cost.

The present invention has been made in light of the foregoing problems, and it is an object of the present invention to reduce dark current caused by leak while at the same time ensuring element reliability using a simple arrangement.

DISCLOSURE OF INVENTION

In an embodiment of the present invention, when a unit pixel is driven, of low and high level sides of a control signal adapted to pulse-drive each of the transistors of the signal output unit, the voltage level of the side to be adjusted that is commensurate with the signal charge or transistor polarity is adjusted so that the longer the signal charge accumulation time, the higher the voltage level. If no signal charge is accumulated, the accumulation time is zero. Therefore, the voltage level of the side to be adjusted is adjusted to a low voltage.

As for dark current caused by a leak phenomenon in which the signal charge generated by the charge generation unit leaks out into the signal output side, the longer the charge accumulation time, the larger the dark current. As a result, noise also becomes a problem. On the other hand, this dark current caused by a leak phenomenon is reduced by increasing the voltage level of the side to be adjusted.

In an embodiment of the present invention, therefore, the voltage level of the side to be adjusted is adjusted so that the longer the signal charge accumulation time, the higher the voltage level. The side to be adjusted is set to a high voltage level only when the charge accumulation time is long, which is the case where dark current caused by a leak phenomenon becomes a problem. The side to be adjusted is set to a low voltage level when the charge accumulation time is short or when no image is captured, which is the case where dark current caused by a leak phenomenon does not become a problem.

Because the side to be adjusted is set to a high voltage level only when the charge accumulation time is long, which is the case where dark current caused by a leak phenomenon becomes a problem, it is possible to suppress stress on the pixels and the gate oxide film of their drive circuits and degradation of the transistor characteristics even if dark current is suppressed.

A solid-state imaging device to which the above arrangement is applied may be in the form of a single chip or a module having a pixel array section (imaging section) and signal processing section or optical system packaged together. Further, the above arrangement is also applicable to not only a solid-state imaging device but also an imaging device. In this case, the imaging device provides the same advantageous effects as the solid-state imaging device. Here, the imaging device refers, for example, to a camera (or camera system) or a portable device having imaging function. On the other hand, the term "imaging" includes not only image capture during normal camera photography but also, in a board sense, fingerprint detection and others.

In an embodiment of the present invention, the voltage level of the side to be adjusted is adjusted so that the longer the signal charge accumulation time, the higher the voltage level. This makes it possible to optimally set the voltage level of the side to be adjusted in such a manner as to suppress dark current caused by a leak phenomenon while at the same time meeting the element reliability. It is possible to achieve compatibility between suppressing dark current and ensuring element reliability. What is required is a simple arrangement adapted to adjust the voltage level of the control signal according to the charge accumulation time. Such an arrangement can be implemented without increasing the thickness of the gate oxide film or adversely affecting the transistor manufacturing steps in other ways, thus eliminating the need to increase the number of manufacturing steps.

BRIEF DESCRIPTION OF DRAWINGS

FIG. 1 is a basic configuration diagram of a solid-state imaging device.

FIG. 5 is a diagram illustrating a circuit configuration according to a first example adapted to permit negative voltage adjustment.

BEST MODE FOR CARRYING OUT THE INVENTION

Figure 2:
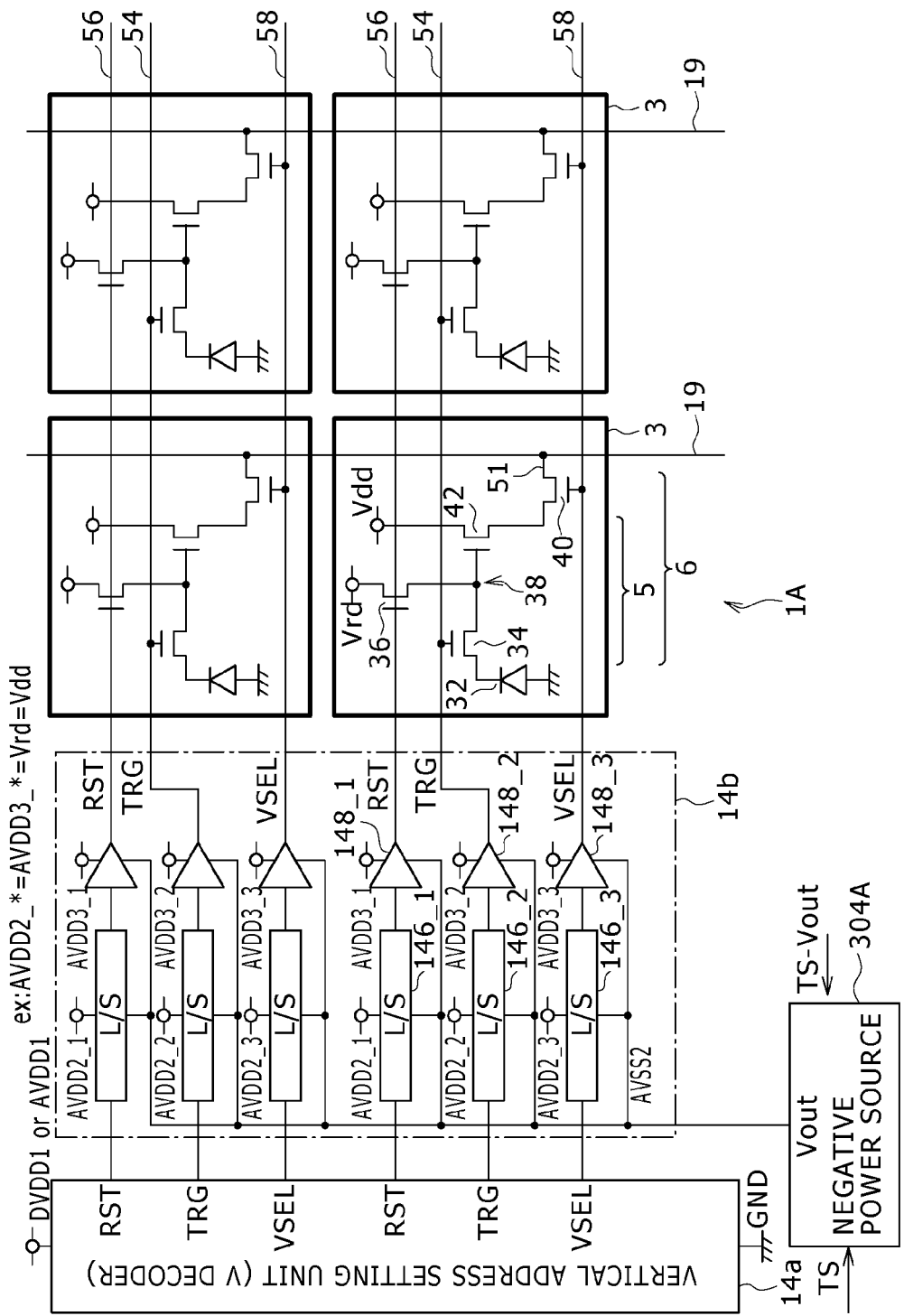
FIG. 2 is a diagram illustrating a solid-state imaging device according to a first embodiment with focus on the interface between the vertical scan unit and pixel array unit.

The preferred embodiments of the present invention will be described below with reference to the accompanying drawings. Where distinction is made between the functional elements of the different embodiments, such elements will be denoted by reference numerals such as capital letters A, B, C and so on. Where no particular distinction is made therebetween for description, such reference numerals will be omitted. The same holds true for the drawings.

It should be noted that a case will be described below in which a CMOS solid-state imaging device, an example of X-Y address solid-state imaging device, is used as a device. Further, unless otherwise specified, the following descriptions will be given assuming that all the unit pixels of the CMOS solid-state imaging device include NMOS (n-channel MOS) transistors and that the signal charges are negative (electrons). However, this is merely an example, and the target devices are not limited to MOS solid-state imaging devices. The unit pixels may include PMOS (p-channel MOS) transistors. The signal charges may be positive (holes). All the embodiments described later are similarly applicable to all semiconductor devices for detecting physical quantity distribution and other electronic equipment which include a liner or matrix arrangement of a plurality of unit pixels sensitive to externally fed electromagnetic waves such as light and radiation, and from which a physical quantity distribution, converted into an electric signal by unit components, can be read out in the form of an electric signal with an arbitrary selection through address control.

<Solid-State Imaging Device: Basic Configuration>

FIG. 1 is a basic configuration diagram of a CMOS solid-state imaging device (CMOS image sensor) which is an embodiment of a solid-state imaging device according to the present invention.

A solid-state imaging device 1 has a pixel array section 10 which includes a plurality of unit pixels 3 arranged two-dimensionally in a matrix form. The device 1 can render the pixel array section 10 capable of color imaging by using, for example, a color separation filter having R, G and B color filters arranged in a Bayer pattern.

Although, in FIG. 1, some rows and columns are omitted for simplification, several tens to thousands of the unit pixels 3 are practically provided for each of the rows and columns. As described later, the unit pixels 3 each have, for example, in addition to a photodiode serving as a photoreceiving element (charge generation section) which is an example of a detection section, an in-pixel amplifier which includes three to four transistors for charge transfer, reset and amplification purposes. The unit pixels 3 output a pixel signal voltage Vx via a vertical signal line 19 on a column-by-column basis. The pixel signal voltage Vx contains a reset level Srst (P-phase component) and a signal level Ssig (D-phase component).

The solid-state imaging device 1 further has a column AD conversion section 26. The section 26 has AD conversion sections 250 arranged in a column-parallel manner. The AD conversion sections 250 handle CDS (Correlated Double Sampling) processing and digital conversion. The term "column-parallel" refers to the fact that a plurality of CDS processing function sections, digital conversion function sections (AD conversion sections) and other sections are provided in parallel for each of the vertical signal lines 19 (an example of column signal lines) in vertical columns. Such a readout scheme is called column readout scheme.

The solid-state imaging device 1 still further includes a drive control section 7, readout current control section 24, reference signal generation section 27 and output section 28. The readout current control section 24 supplies an operating current (readout current) for reading out the pixel signal to the unit pixels 3. The reference signal generation section 27 supplies a reference signal SLP_ADC for AD conversion to the column AD conversion section 26.

The drive control section 7 includes a horizontal scan section 12 (column scan circuit), vertical scan section 14 (row scan circuit) and communication/timing control section 20 to provide control circuit functions for sequential readout of the signals from the pixel array section 10.

The horizontal scan section 12 has a horizontal address setting unit 12a, horizontal drive unit 12b and other sections. The horizontal address setting unit 12a controls the column addresses and column scan. The vertical scan section 14 has a vertical address setting unit 14a, vertical drive unit 14b and other sections. The vertical address setting unit 14a controls the row addresses and row scan. The horizontal and vertical scan sections 12 and 14 begin their row and column selections (scans) in response to control signals CN1 and CN2 supplied from the communication/timing control section 20.

The section 20 includes a timing generator (an example of readout address control device) functional block. This functional block supplies a clock, which is synchronous with a master clock CLK0 fed via a terminal 5a, to various sections (such as the horizontal scan section 12, vertical scan section 14 and column AD conversion section 26) of the device. The same section 20 further includes a communication interface functional block. This functional block receives the master clock CLK0 from an external main control section via the terminal 5a. The same functional block further receives data adapted to specify, for example, the operation mode to be used, from the external main control section via a terminal 5b. This functional block also outputs, to the external main control section, the data containing information about the solid-state imaging device 1.

For example, the communication/timing control section 20 has a clock conversion unit 20a and system control unit 20b and other units. The clock conversion unit 20a has a clock conversion function adapted to generate an internal clock. The system control unit 20b controls not only the communication function but also various sections. The clock conversion unit 20a incorporates a frequency multiplier adapted to generate pulses higher in frequency than the master clock CLK0 fed via the terminal 5a based on this clock, generating internal clocks such as count clocks CKcnt1 and CKdac1.

The output section 28 has a sense amplifier 28a (S·A) and interface section 28b (IF section). The sense amplifier 28a detects the signal (small in amplitude although being digital) on a horizontal signal line 18. The interface section 28b handles interfacing between the solid-state imaging device 1 and external equipment. The output of the interface section 28 is connected to an output terminal 5c so that video data is output to the circuit at the subsequent stage. The output section 28 may have a digital operation section between the sense amplifier 28a and interface section 28b to handle various types of digital operations.

The unit pixels 3 are each connected to the vertical scan section 14 via a row control line 15 adapted to select rows and to one of the AD conversion sections 250 provided one for each of the vertical columns of the column AD conversion section 26 via the vertical signal line 19. Here, the row control lines 15 refer to wirings in general coming from the vertical scan section 14 and going into the pixels.

Various AD conversion schemes are possible for use in the AD conversion sections 250 from the viewpoint of circuit scale, processing speed (speed enhancement), resolution and other factors. As an example, an AD conversion scheme, which is called the reference signal comparison, slope integrating or ramp signal comparison AD conversion scheme, is used. In the reference signal comparison AD conversion, the effective period for the counting operation is determined based on the time from the start (start of the comparison) to end (end of the comparison) of the conversion. The analog target signal is converted into digital data based on a count enable signal EN which indicates the effective period.

Therefore, the reference signal generation section 27 has a DA conversion section 270 (DAC: Digital Analog Converter), generating the reference signal SLP_ADC of the slope (rate of change) indicated by control data CN4 from the communication/timing control section 20. The section 270 generates the reference signal from the initial value indicated by the control data CN4 from the communication/timing control section 20, in synchronism with the count clock CKdac1. The count clock CKdac1 may be the same as the count clock CKcnt1 for a counter section 254.

The AD conversion sections 250 each include a comparison section 252 (COMP) and a counter section 254 which can be switched between up-count and down-count modes. In this example, each of the sections 250 further includes a switch section 258 and data storage section 256 at the subsequent stage of the counter section 254. The comparison section 252 compares the reference signal SLP_ADC, generated by the reference signal generation section 27, with the analog pixel signal voltage Vx obtained from the unit pixels 3 in the selected rows via the vertical signal line 19 (H1, H2, . . . , Hh). The counter section 254 counts the active duration of the count enable signal EN with the count clock CKcnt1 and holds the count result. The count enable signal EN has a constant relationship with a comparison output Co of the comparison section 252.

The communication/timing control section 20 supplies a control signal CN5 to the counter section 254 of each of the AD conversion sections 250. The control signal specifies control information. Such control information includes whether the counter section 254 operates in down-count or up-count mode to count P- and D-phases. Such control information also includes the setting and resetting of an initial value Dini for the counting of P-phases and other information.

The input terminal (+), one of the two terminals of each of the comparison sections 252, is supplied with the reference signal SLP_ADC generated by the reference signal generation section 27, together with the other input terminals (+). The input terminal (−), the other of the two terminals thereof, is connected to the associated one of the vertical signal lines 19 arranged in vertical columns and supplied with the pixel signal voltage Vx from the pixel array section 10.

The clock terminal CK of the counter section 254, together with the other clock terminals CK, are supplied with the count clock CKcnt1 from the communication/timing control section 20. If the data storage section 256 is not provided, the counter section 254, together with the other counter sections 254, are supplied with a control pulse from the horizontal scan section 12 via a control line 12c. Each of the counter sections 254 has a latching function to hold the count result and holds the count output value until instructed by the control pulse supplied via the control line 12c.

In the present embodiment, the CDS processing is completed by the AD conversion sections 250. However, P-phase data at the reset level Srst and D-phase data at the signal level Ssig may be transferred separately to the output section 28 so that CDS processing is handled by the digital operation sections provided at the subsequent stage of the AD conversion sections 250. The present applicant has proposed various reference signal comparison AD conversion schemes adapted to perform AD conversion and CDS processing using the AD conversion sections 250, and these schemes can be basically used in all the embodiments.

The solid-state imaging device 1 according to the present embodiment is configured in the form of a single-chip device (provided on the same semiconductor substrate) in which the respective components of the drive control section 7 such as the horizontal and vertical scan sections 12 and 14 are formed integrally with the pixel array section 10 in a single crystal silicon or other semiconductor region using the same technique as the semiconductor integrated circuit manufacturing technique.

The solid-state imaging device 1 may be in the form of a single chip with its components formed integrally in the semiconductor region as described above. Alternatively, however, the device 1 may be in the form of an imaging-capable module having, in addition to the pixel array section 10, drive control section 7, column AD conversion section 26 and other signal processing sections, an optical system such as an imaging lens, optical low-pass filter or infrared cutting filter packaged together, although the illustration thereof is omitted.

As the output side of each of the AD conversion sections 250, the output of the counter section 254, for example, may be connected to the horizontal signal line 18. Alternatively, the data storage section 256 serving as a memory and the switch section 258 may be provided at the subsequent stage of the counter section 254 as illustrated in the figure. The counter section 254 has a latching function to hold the count result of the counter section 254. The switch section 258 is provided between the counter section 254 and data storage section 256. The switch section 258 has a switch SW for each of the vertical columns.

In the configuration including the data storage sections 256, the switch SW, together with other switches SW along the vertical columns, are supplied with a memory transfer instruction pulse CN8 as a control pulse at a predetermined timing from the communication/timing control section 20. When supplied with the memory transfer instruction pulse CN8, the switches SW of the switch section 258 transfer the counter values of the associated counter sections 254 to the data storage sections 256. The data storage sections 256 hold and store the transferred count values. The sections 256 are supplied with a control pulse from the horizontal scan section 12 via the control line 12c. The same sections 256 hold the counter values from the counter sections 254 until instructed by the control pulse supplied via the control line 12c.

The horizontal scan section 12 is capable of serving as a readout scan section, reading out the count values from the data storage sections 256 in parallel with the processing handled by the comparison sections 252 and counter sections 254 of the column AD conversion section 26. The outputs of the data storage sections 256 are connected to the horizontal signal lines 18. The horizontal signal lines 18 are each as wide or twice as wide (e.g., for complementary output) as the bit width of the AD conversion section 250. The same lines 18 are connected to the output section 28 having the sense amplifiers 28a associated with the output lines. It should be noted that the counter sections 254, data storage sections 256, switch section 258 and horizontal signal lines 18 are each configured to handle n bits.

Here, the solid-state imaging device 1 according to the present embodiment is driven by two power sources, one digital and another analog. Four power terminals (not shown), i.e., a power terminal for a digital positive voltage DVDD, another for a digital ground voltage DVSS, still another for an analog positive voltage AVDD and still another for an analog ground voltage AVSS, are provided in the semiconductor chip in which the solid-state imaging device 1 is formed.

The solid-state imaging device 1 includes a power source unit 300 adapted to generate source voltages based on an accumulation time setting ST supplied as an instruction from the communication/timing control unit 20 and voltage setting information TS-Vout for manual adjustment. The source voltages are supplied to different units. The power source unit 300 includes a positive power source 302 and negative power source 304. The positive power source 302 generates a digital positive voltage DVDDw or analog positive voltage AVDDw by increasing the digital positive voltage DVDD or analog positive voltage AVDD. The negative power source 304 generates a digital negative voltage DVSSw or analog negative voltage AVSSw based on the digital positive voltage DVDD. That is, the solid-state imaging device 1 is configured in the form of a so-called single chip device formed integrally in the semiconductor region made, for example, of single-crystalline silicon using the same techniques as those for manufacturing semiconductor integrated circuits. The same device 1 includes the power source unit 300 and other components such as the drive control unit 7 and output unit 28 together with the pixel array unit 10.

In the present embodiment, the digital positive voltage DVDD or analog positive voltage AVDD is increased by the positive power source 302, and further, the digital negative voltage DVSSw or analog negative voltage AVSSw is generated by the negative power source 304, thus generating different source voltage levels in the solid-state imaging device 1 (semiconductor chip). This arrangement makes it possible to produce a plurality of source voltages in the chip even if only one source voltage is supplied from outside the semiconductor chip. Using the digital negative voltage DVSS reduces noise which causes dark current.

It should be noted that here both the positive and negative power sources 302 and 304 are incorporated in the solid-state imaging device 1 as an example. However, the positive and negative power sources 302 and 304 may be provided in a region separate from the semiconductor region where the pixel array unit 10, drive control unit 7 and other components are formed (refer to an imaging device 8 which will be described later).

Interface between the Pixel Array Unit and Vertical Scan Unit

First Embodiment

Figure 2A:
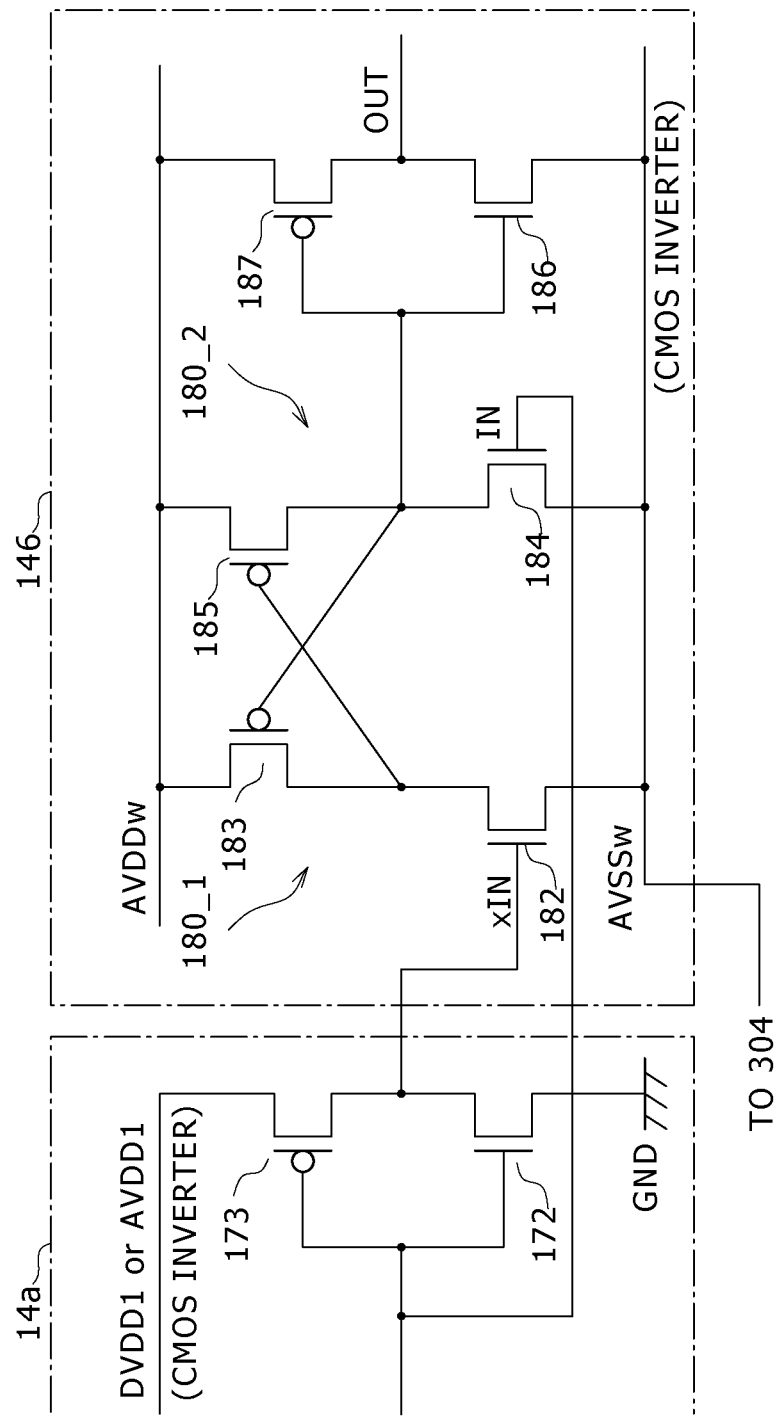
FIG. 2A is a diagram describing a circuit example of an interface portion between the vertical address setting unit and vertical drive unit.

FIG. 2 is a diagram illustrating a solid-state imaging device 1A according to a first embodiment with focus on the interface between the vertical scan unit 14 and pixel array unit 10. FIG. 2A is a diagram describing a circuit example of an interface portion between the vertical address setting unit 14a and vertical drive unit 14b.

The unit pixel 3 includes four transistors (readout selection transistor 34, reset transistor 36, vertical selection transistor 40 and amplifying transistor 42), each having a different function, as its basic elements in addition to the charge generation section 32. The readout selection transistor 34, reset transistor 36, and amplifying transistor 42 make up, together with a floating diffusion 38, the pixel signal generation section 5 (signal output section). Then, the pixel signal generation section 5 and vertical selection transistor 40 make up a signal output section 6. The same section 6 generates and outputs the pixel signal voltage Vx for the signal charge generated by the charge generation section 32. The transistors 34, 36, 40 and 42 may also be collectively referred to as the pixel transistors.

The gate of the readout selection transistor 34 (transfer transistor/readout transistor) making up the transfer section is connected, together with the gates of the same transistors 34 in the same rows, to a transfer wiring 54. The gates are driven by a transfer signal TRG. The gate of the reset transistor 36 making up an initialization section is connected, together with the gates of the same transistors 36 in the same row, to a reset wiring 56. The gates are driven by a reset signal RST. The gate of the vertical selection transistor 40 (select transistor) is connected, together with the gates of the same transistors 40 in the same row, to a vertical selection line 58. The gates are driven by a vertical selection signal VSEL. The transfer wiring 54, reset wiring 56 and vertical selection line 58 are the row control lines 15 shown in FIG. 1.

In general, a binary pulse which is active at high level (source voltage level) and inactive at low level (reference level) is used for all the signals, i.e., the transfer signal TRG, reset signal RST and vertical selection signal VSEL. The source voltage level is, for example, about 3 V. The reference level is, for example, 0.4 to 0.7 V or ground level, i.e., 0 V. However, some or all the pulses may be a negative potential of about −1 V depending on circumstances.

The charge generation sections 32, an example of detection section, which include a photodiode PD or other photoreceiving element DET, each have one end (anode side) of the photoreceiving element DET connected to a reference potential Vss on the low potential side (negative potential, for example, at about −1 V). The sections 32 each have the other end (cathode side) of the photoreceiving element DET connected to the input terminal (typically source) of the readout selection transistor 34. It should be noted that the reference potential Vss may be a ground potential GND. The readout selection transistor 34 has its output terminal (typically drain) connected to a connection node to which the reset transistor 36, floating diffusion 38 and amplifying transistor 42 are connected. The reset transistor 36 has its source connected to the floating diffusion 38 and its drain connected to a reset power source Vrd (normally serves also as a power source Vdd for analog=AVDD)).

The vertical selection transistor 40 has, for example, its drain connected to the source of the amplifying transistor 42, its source connected to a pixel line 51 and its gate (specifically, referred to as a vertical selection gate SELV) connected to the vertical selection line 58. The pixel line 51 is connected, together with the other pixel lines 51 in the same column, to the vertical signal line 19. The amplifying transistor 42 has its gate connected to the floating diffusion 38, its drain connected to the power source Vdd and its source connected to the pixel line 51 and further to the vertical signal line 19 via the vertical selection transistor 40. It should be noted that the present embodiment is not limited to this configuration. Alternatively, the vertical selection transistor 40 and amplifying transistor 42 may be reversed in their positions so that the vertical selection transistor 40 has its drain connected to the power source Vdd and its source connected to the drain of the amplifying transistor 42 and so that the amplifying transistor 42 has its source connected to the pixel line 51.

One end of the vertical signal line 19 extends toward the column AD conversion section 26. The same line 19 is connected to the readout current control section 24 along its route. Although the detailed illustration thereof is omitted, the readout current control section 24 has a load MOS transistor along each vertical column and makes up, together with a reference current source section, a current mirror circuit having the gates of the load MOS transistors connected together. This current mirror circuit serves as a current source for the vertical signal lines 19. The section 24 also makes up, together with the amplifying transistor 42, a source follower which supplies an approximately constant operating current (readout current).

The vertical scan unit 14 is supplied, as a source voltage, with the digital positive voltage DVDDw or analog positive voltage AVDDw at its positive power terminal from the positive power source 302. The same unit 14 is supplied, as a source voltage, with the digital negative voltage DVSSw or analog negative voltage AVSSw at its negative power terminal from the negative power source 304 (x: any one of 1 to 3). On the other hand, its standard terminal is connected to a standard potential (is grounded). For example, the vertical address setting unit 14a is configured, for example, to use a decoder. The same unit 14a is supplied with a digital positive voltage DVDD1 or an analog positive voltage AVDD1 at its positive power terminal from the positive power source 302, with its standard terminal connected to the standard potential (grounded).

The vertical drive unit 14b includes level shifters 146 (L/S) and drivers 148 for the row control lines (transfer wiring 54, reset wiring 56 and vertical selection line 58) in each row. The level shifters 146 and drivers 148 have their positive power terminals connected to the unshown positive power source 302 and their negative power terminals connected to the negative power source 304 (detailed description will be given later).

For example, the vertical address setting unit 14a includes a CMOS inverter at its output stage as illustrated in FIG. 2A. The CMOS inverter is made up of two MOS transistors connected in series, i.e., an re-channel MOS transistor (nMOS172) provided on the ground side and a p-channel MOS transistor (pMOS173) provided on the positive power side, to produce a complementary output pulse. The input side of the CMOS inverter serves as a non-inverted input IN of the level shifter 146, and the output of the CMOS inverter as an inverted input xIN of the level shifter 146.

The level shifters 146 are each a step-up level shifter which includes first and second circuit blocks 180_1 and 180_2 and a CMOS inverter. The first and second circuit blocks 180_1 and 180_2 are a differential pair. Each of the circuit blocks 180_1 and 180_2 is supplied with the analog positive voltage AVDDw at its positive power end from the positive power source 302 and the analog negative voltage AVSSw at its negative power end from the negative power source 304. The analog positive voltage AVDDw is higher than the digital positive voltage DVDD1 or analog positive voltage AVDD1 supplied to the vertical address setting unit 14a.

The first circuit block 180_1 is made up of an nMOS182 on the negative power side and a pMOS183 on the positive power side connected in series. The second circuit block 180_2 is made up of an nMOS184 on the negative power side and a pMOS185 on the positive power side connected in series. The first and second circuit blocks 180_1 and 180_2 are cross-coupled, with the drain of the nMOS182 of the first circuit block 180_1 connected to the gate of the pMOS185 of the second circuit block 180_2, and the drain of the nMOS184 of the second circuit block 180_2 connected to the gate of the pMOS183 of the first circuit block 180_1. The CMOS inverter is made up of an nMOS186 on the negative power side and a pMOS187 on the positive power side connected in series. The output (connection point between the nMOS184 and pMOS185) of the second circuit block 180_2 is connected to the gates of the nMOS186 and pMOS187.

The inverted input xIN is supplied to the gate of the nMOS182, and the non-inverted input IN to the gate of the nMOS184. An output pulse (with an amplitude ranging from about AVSSw to AVDDw) opposite in logic to the inverted input xIN is obtained from the drain of the nMOS182. This output pulse is supplied to the gate of the pMOS185. An output pulse (with an amplitude ranging from about AVSSw to AVDDw) opposite in logic to the non-inverted input IN is obtained from the drain of the nMOS184. This output pulse is supplied to the gate of the pMOS183. That is, the level shifters 146 each have a complementary (differential) input interface at its input stage and are configured to have a cross-coupled positive feedback loop at its output stage thanks to a complementary input pulse supplied to the gates of the nMOS182 and nMOS184.

The non-inverted input IN is fed to the second circuit block 180_2 and inverted in logic, and further inverted in logic by the CMOS inverter (nMOS186 and pMOS187). This provides an output pulse that is identical in logic to the input but converted in voltage level. In the present example, the level shifters 146 are each supplied with the digital positive voltage DVDD1 (or analog positive voltage AVDD1) as high level and GND input pulse (transfer pulse TRG, reset pulse RST and vertical selection pulse VSEL) as low level from the vertical address setting unit 14a. Then, the level shifters 146 each convert the input pulse, changing its high level to the analog positive voltage AVDDw and its low level to the analog negative voltage AVSSw and outputting the converted pulse. The pulses converted in voltage level by the level shifters 146 are supplied to the associated transistors 34, 36 and 42 of the unit pixel 3 via the drivers 148.

In the vertical drive unit 14b of the solid-state imaging device 1A according to the first embodiment, the following voltages are supplied to the power terminals of the level shifters 146 and drivers 148. First, an analog positive voltage AVDD2_1 is supplied to the positive power terminal of a level shifter 146_1 for the reset pulse RST from the positive power source 302. An analog positive voltage AVDD2_2 is supplied to the positive power terminal of a level shifter 146_2 for the transfer pulse TRG from the positive power source 302. An analog positive voltage AVDD2_3 is supplied to the positive power terminal of a level shifter 146_3 for the vertical selection pulse VSEL from the positive power source 302.

An analog positive voltage AVDD3_1 is supplied to the positive power terminal of a driver 148_1 for the reset pulse RST from the positive power source 302. An analog positive voltage AVDD3_2 is supplied to the positive power terminal of a driver 148_2 for the transfer pulse TRG from the positive power source 302. An analog positive voltage AVDD3_3 is supplied to the positive power terminal of a driver 148_3 for the vertical selection pulse VSEL from the positive power source 302.

The digital positive voltage DVDD1 (or analog positive voltage AVDD1) for the vertical address setting unit 14a, the analog positive voltages AVDD2_1, AVDD2_2 and AVDD2_3 for the level shifters 146, and the analog positive voltages AVDD3_1, AVDD3_2 and AVDD3_3 for the drivers 148 are treated, for example, as follows. First, the positive power source for the vertical address setting unit 14a may be digital or analog. In the vertical drive unit 14b, on the other hand, the AVDD2_1, AVDD2_2, AVDD2_3, AVDD3_1, AVDD3_2 and AVDD3_3 are all common voltages. Naturally, this is merely an example, and may be modified as appropriate as described in Republished Patent Application No. WO2003/085964.

Further, in the vertical drive unit 14b according to the first embodiment, the negative power terminals of the level shifters 146 and drivers 148 are all connected together to a negative power source 304A, irrespective of which of the reset pulse RST, transfer pulse TRG and vertical selection pulse VSEL the level shifters 146 and drivers 148 are used for so that the same analog negative voltage AVSS2 is supplied. The negative power source 304A according to the first embodiment receives accumulation time setting information (accumulation time setting TS) from an external main control unit, generating (adjusting) an output voltage Vout based on this information. Therefore, the analog negative voltage AVSS2 is adjusted to a negative voltage level commensurate with the accumulation time setting TS.

<Configuration Example of Negative Power Source>

Figure 3:
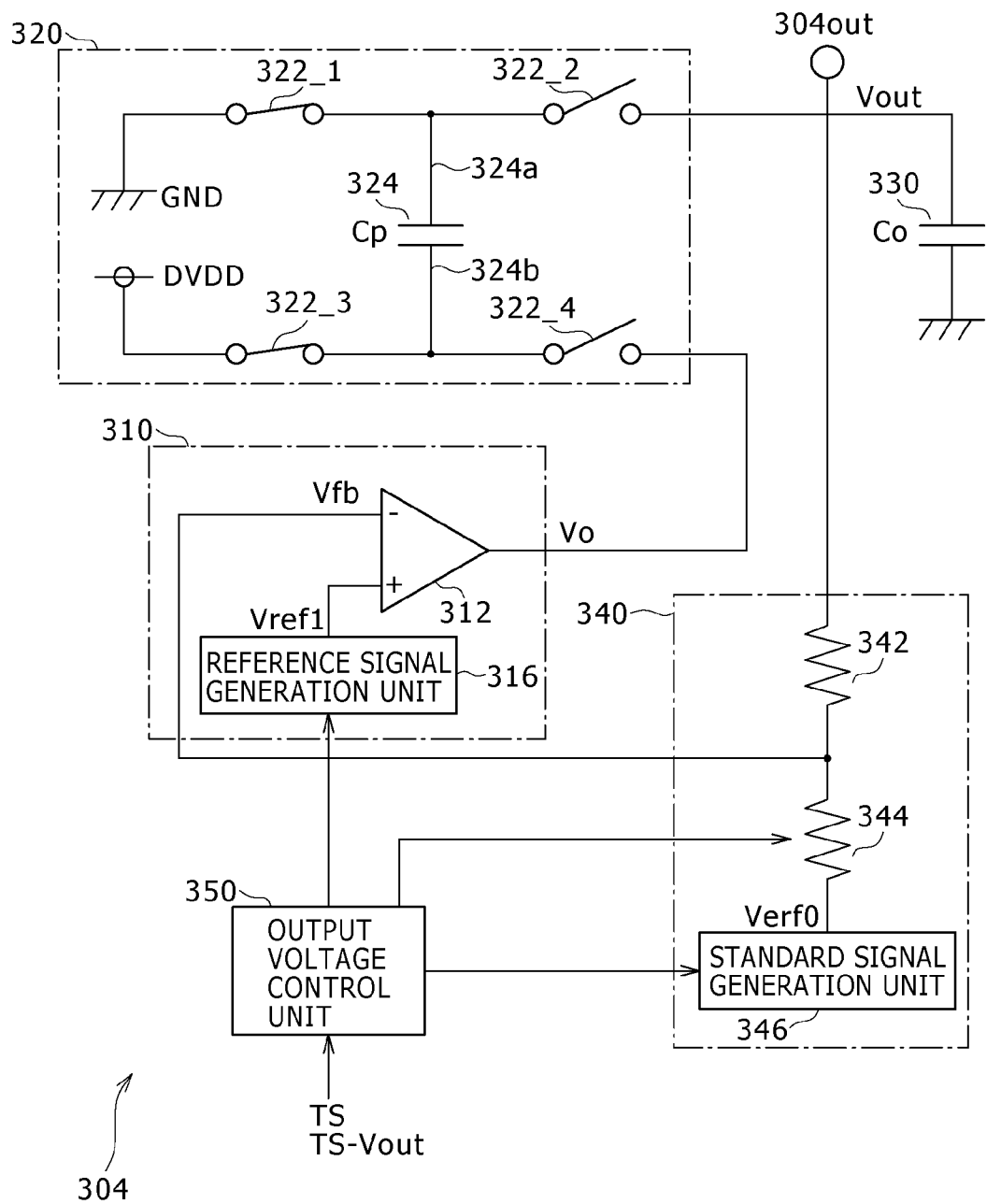
FIG. 3 is a diagram illustrating a configuration example of the negative power source.

FIG. 3 is a diagram illustrating a configuration example of the negative power source 304. The negative power source 304 uses a charge pump circuit. More specifically, the negative power source 304 includes an error amplification unit 310, source voltage generation unit 320, smoothing capacitor 330, feedback unit 340 and output voltage control unit 350. The maximum negative level of the analog negative voltage AVSSw commensurate with the output voltage Vout should be set to a level where the device (particularly, transistors of the unit pixels 3 of the pixel array unit 10) does not break down.

The source voltage generation unit 320 generates the output voltage Vout based on the output of the error amplification unit 310. The output voltage control unit 350 controls the error amplification unit 310 and feedback unit 340 based on the accumulation time setting TS, adjusting the output voltage Vout generated by the source voltage generation unit 320.

The error amplification unit 310 includes an error amplifier 312 and reference signal generation unit 316. The error amplifier 312 includes, for example, an operational amplifier. The reference signal generation unit 316 generates a reference voltage Vref1 (reference signal). The error amplifier 312 is supplied with the reference voltage Vref1 at its non-inverted input end (+) from the reference signal generation unit 316 and a feedback voltage Vfb (feedback signal) at its inverted input end (−) from the feedback unit 340.

The source voltage generation unit 320 includes switches 322_1 to 322_4 and a pump capacitor 324 of a capacitance Cp. The switch 322_1 has one end grounded and the other end connected to one end 324a of the pump capacitor 324 and one end of the switch 322_2. The switch 322_2 has the other end connected to an output terminal 304out of the negative power source 304 that is a connection point between one end of the smoothing capacitor 330 and the feedback unit 340. The other end of the smoothing capacitor 330 is grounded.

The switch 322_3 has one end supplied with the digital positive voltage DVDD and the other end connected to other end 324b of the pump capacitor 324 and to one end of the switch 322_4. The other end of the switch 322_4 is connected to the output end of the error amplifier 312.

The feedback unit 340 includes first and second resistive elements 342 and 344 and a standard signal generation unit 346. The same unit 346 generates a standard voltage Vref0 (standard signal). The first resistive element 342 has one end connected to the output terminal 304out and the other end connected to one end of the second resistive element 344. The standard voltage Vref0 is supplied to the other end of the second resistive element 344 from the standard signal generation unit 346. The feedback unit 340 resistively divides the voltage between the standard voltage Vref0 and the output voltage Vout (negative voltage) of the output terminal 304out with the resistive elements 342 and 344, generating the feedback voltage Vfb. The error amplifier 312 of the error amplification unit 310 amplifies the difference between the feedback voltage Vfb and reference voltage Vref1, generating a control voltage Vo (falling within the range from 0 V to the digital positive voltage DVDD) and supplying the same voltage Vo to the switch 322_4. A negative feedback circuit is formed as a whole.

Here, the switches 322_1 and 322_3 are turned on, and the switches 322_2 and 322_4 turned off first. This connects the digital positive voltage DVDD and ground (GND) via the pump capacitor 324, charging the same capacitor 324. Then, the switches 322_1 and 322_3 are turned off, and the switch 322_4 is turned on. This connects other end 324b of the pump capacitor 324 to the output end of the error amplifier 312. Because the control voltage Vo is greater than 0 but smaller than the digital positive voltage DVDD, the one end 324a of the pump capacitor 324 assumes a negative voltage relative to ground. If, at this time, the switch 322_2 is turned on, the charge accumulated in the pump capacitor 324 is capacitively divided between the pump capacitor 324 and smoothing capacitor 330, causing negative charge to be stored in the smoothing capacitor 330. As a result, the negative output voltage Vout is generated at the output terminal 304out. The negative output voltage Vout is commensurate with the analog negative voltage AVSSw.

This output voltage Vout is dependent on the control voltage Vo. On the other hand, the control voltage Vo is defined by the reference voltage Vref1 and feedback voltage Vfb. The feedback voltage Vfb is defined by the output voltage Vout, the resistance ratio between the resistive elements 342 and 344, and the standard voltage Vref0. The negative power source 304 forms a negative feedback circuit as a whole. As a result, the output voltage Vout is controlled at a constant level by the resistance ratio between the resistive elements 342 and 344, standard voltage Vref0 and reference voltage Vref1. In other words, the output voltage Vout can be adjusted by adjusting the resistance ratio between the resistive elements 342 and 344, standard voltage Vref0 or reference voltage Vref1 (or two or more thereof).

<Basics of Adjusting the Negative Voltage>

Figure 4:
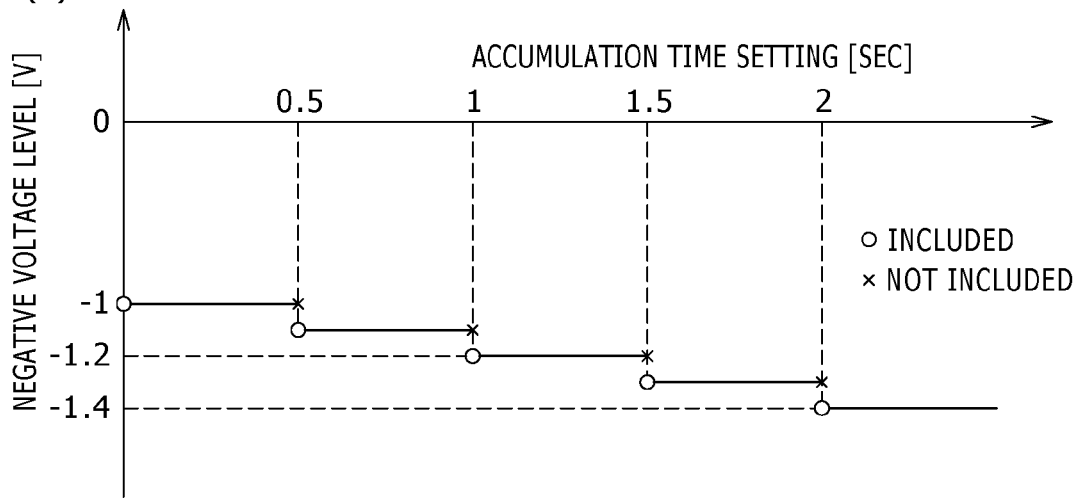
FIG. 4 are diagrams describing examples of adjustment of the negative output voltage Vout (commensurate with the digital negative voltage DVSSw) output from the negative power source.
Figure 4:
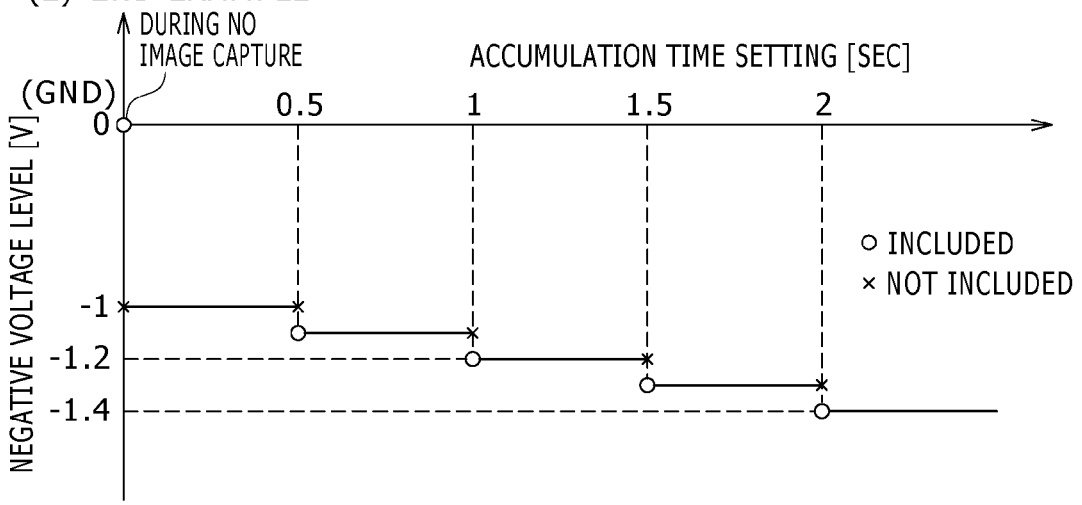

FIG. 4 are diagrams describing examples of adjustment of the negative output voltage Vout (commensurate with the analog negative voltage AVSSw) output from the negative power source 304. In the present embodiment, the negative power source 304 is configured so that the output voltage Vout of the output terminal 304out is adjustable. However, the adjustment thereof is made according to the accumulation time setting during image capture. The basic philosophy is to ensure that, of low and high level sides of each of the control signals (transfer pulse TRG, reset pulse RST and vertical selection pulse VSEL) adapted to pulse-drive one of the transistors 34, 36 and 42 of the signal output unit 6, the voltage level of the side commensurate with the signal charge polarity is adjusted so that the longer the signal charge accumulation time, the higher the voltage level.

In the present embodiment, each of the transistors of the signal output unit 6 includes an NMOS transistor, and the signal charge is negative (electrons). Therefore, the longer the accumulation time, the higher the negative level of the output voltage Vout (analog negative voltage AVSSw) of the negative power source 304 commensurate with the negative charge polarity is adjusted. The levels of the control signal voltages adapted to drive the pixel transistors are set in conjunction with the charge accumulation time setting.

This is based on the fact that although noise caused by dark current increases with longer accumulation time, for example, in the case of image capture under low illuminance, dark current can be reduced by increasing the negative level of the digital negative voltage DVSSw (in particular, that for the readout selection transistor 34).

The longer the charge accumulation time, the more problematic the dark current can become. However, increasing the negative voltage level with longer charge accumulation time can reduce dark current, providing improved S/N ratio and thereby improved image quality. When attention is focused on the readout selection transistor 34, using the negative voltage makes it possible to secure a large transfer gate amplitude, allowing to increase the saturation signal amount of the charge generation units 32 (photodiodes) and expand the dynamic range. Reduction in dark current in itself contributes to improved dynamic range.

As illustrated in FIG. 4(1), for example, the output voltage Vout (negative voltage level) of the output terminal 304out relative to the accumulation time setting TS is −1.0 V when 0 sec≦TS<0.5 sec, −1.1 V when 0.5 sec≦TS<1.0 sec, −1.2 V when 1.0 sec≦TS<1.5 sec, −1.3 V when 1.5 sec≦TS<2 sec, and −1.4 V when 2.0 sec≦TS. Thus, the longer the accumulation time, the higher the negative voltage.

It should be noted that although the negative voltage level is adjusted in five steps here, the negative voltage level may be adjusted in four or less steps or six or more steps. It is needless to say that the number of members such as the switches 318 and 348, reference signal generation unit 316 and standard signal generation unit 346, and the number of control lines adapted to control the switches 318 and 348 increase or decrease with change in the number of steps. Naturally, it is possible to adopt a configuration for adjusting the negative voltage level steplessly.

Further, during no image capture when signal charge is not accumulated, the accumulation time is zero. Therefore, the negative voltage level may be small. As a result, it is unnecessary to have a negative voltage level. As illustrated in FIG. 4(2), therefore, the voltage level may be equal to the standard voltage (ground=0 V in the present example). If the voltage during no image capture is used as a standard potential, it is possible to positively suppress stress on the pixels and the transistors of their drive circuits and characteristic degradation.

It should be noted that the relationship between the accumulation time setting TS and output voltage Vout as illustrated in FIG. 4 may be set and registered in advance for use as a fixed relationship. Alternatively, the relationship may be changed as appropriate based on the voltage setting information TS-Vout supplied from an external main control unit. Dark current occurs under different circumstances if the temperature environment changes. However, if a countermeasure as described above is taken, it is possible to change as appropriate (manually adjust) the output voltage Vout relative to the accumulation time from an unshown control panel of an imaging device 8 in accordance with the state of affairs even when the power source unit 300 does not have a function to automatically adjust the output voltage Vout in accordance with the environmental conditions.

Negative Voltage Adjustment

First Example

FIG. 5 is a diagram illustrating a circuit configuration of the negative power source 304 according to a first example adapted to permit negative voltage adjustment shown in FIG. 4. The first example is designed to adjust the feedback voltage Vfb by adjusting the resistance ratio between the resistive elements 342 and 344 while at the same time maintaining the standard voltage Vref0 and reference voltage Vref1 constant, thus adjusting the output voltage Vout.

More specifically, the second resistive element 344 includes a combination of resistive elements and switches. A resistance R_344 of the second resistive element 344 is adjusted by controlling the on/off operations of the switches, thus adjusting the feedback voltage Vfb and output voltage Vout. The plurality of resistive elements may be arranged in a variety of manners including a series circuit, parallel circuit and series/parallel circuit. The switches are arranged so as to change, as appropriate, the composite resistance for the variety of resistor circuit configurations. To simplify the description, a description will be given below of an example in which the second resistive element 344 includes a plurality of resistive elements that are cascaded.

First, in a negative power source 304_1 according to the first example, the second resistive element 344 includes a plurality of second resistive elements 344_1 to 344_*x* (where x=1 to 5 in the figure) that are cascaded. A switch 348_*x* is connected in parallel to each of the second resistive elements 344_*x* on the side of the standard signal generation unit 346 other than the second resistive element 344_1. The output voltage control unit 350 includes a control logic 354 adapted to control the switches 348_*x*. Each of the switches 348_*x* is supplied with a switch control signal SW_x at its control input end from the control logic 354.

The control logic 354 controls which of the switches 348_*x* is to be turned on according to the accumulation time (electronic shutter) setting supplied externally. This allows for the resistance R_344 of the second resistive element 344 to be adjusted according to the accumulation time setting, thus adjusting the output voltage Vout according to the accumulation time setting.

That is, the output voltage control unit 350 varies the resistance R_344 according to the accumulation time setting using the switches 348_*x* provided in the second resistive element 344, thus changing the resistance ratio between the resistive elements 342 and 344 and thereby setting the negative voltage according to the accumulation time setting as illustrated in FIG. 4. As described above, by using a circuit adapted to determine the negative voltage by adjusting the feedback voltage Vfb which is done by adjusting the resistance ratio between the resistive elements 342 and 344 of the feedback unit 340, it is possible to readily adjust, with a small-scale circuit, the negative voltage level according to the accumulation time setting without adversely affecting the power consumption.

The present example adjusts the feedback voltage Vfb by adjusting the resistance ratio between the resistive elements 342 and 344. Alternatively, however, it is possible to adopt a configuration for adjusting the feedback voltage Vfb (negative voltage level) steplessly by using a variable resistive element (e.g., using an operational resistance of a semiconductor element) whose resistance can be steplessly adjusted. It should be noted, however, that the resistance of such a variable resistive element is generally affected by environmental conditions such as temperature, thus resulting in poorer accuracy in controlling the feedback voltage Vfb, i.e., output voltage Vout. In this respect, if the second resistive element 344 equivalently includes the plurality of second resistive elements 344_*x* and the plurality of switches SW_x, and if the on/off operations of the switches SW_x are controlled by the output voltage control unit 350, this arrangement is advantageous in that it provides higher accuracy in controlling the feedback voltage Vfb and output voltage Vout.

Negative Voltage Adjustment

Second Example

Figure 5A:
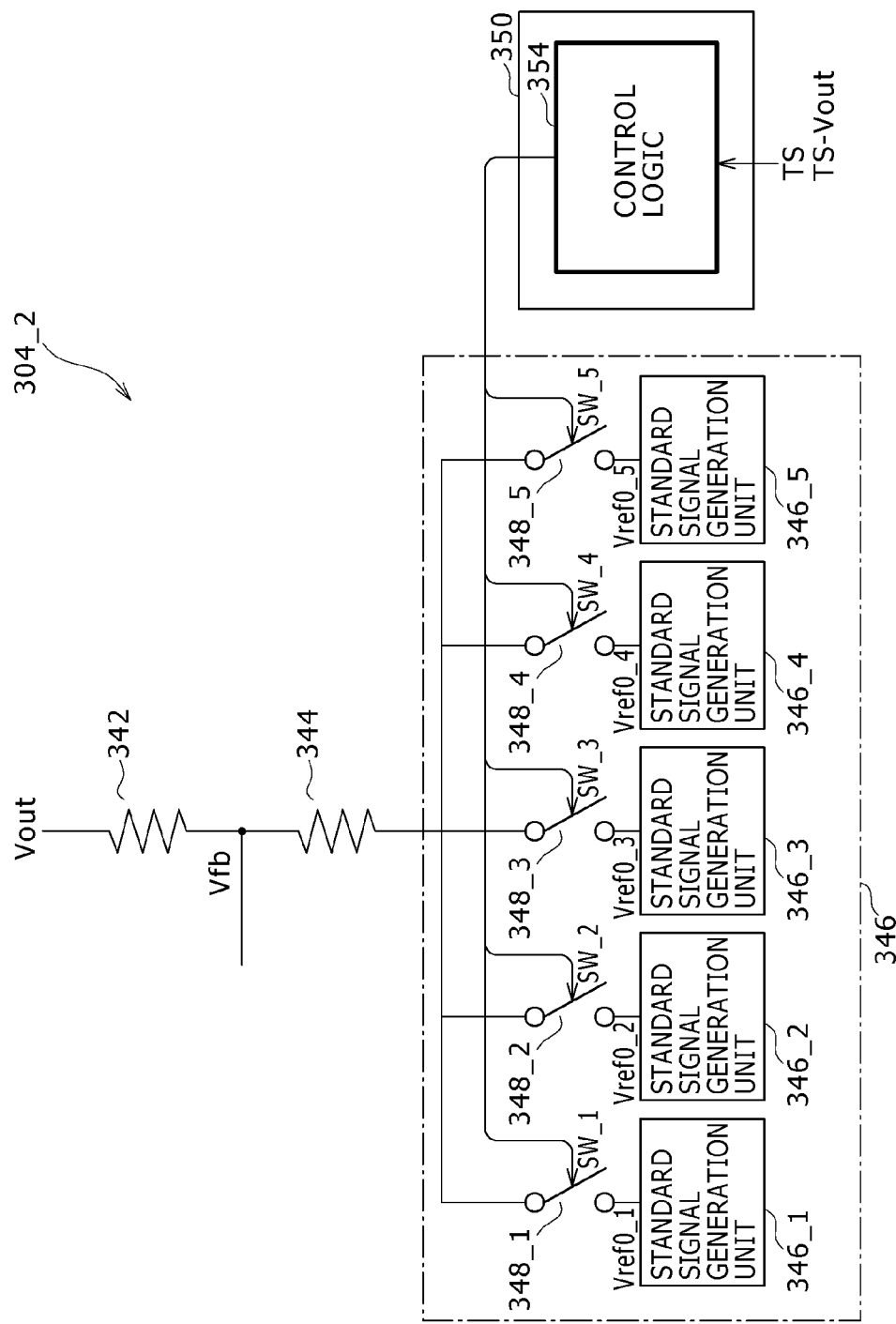
FIG. 5A is a diagram illustrating a circuit configuration according to a second example adapted to permit negative voltage adjustment.

FIG. 5A is a diagram illustrating a circuit configuration of the negative power source 304 according to a second example adapted to permit negative voltage adjustment shown in FIG. 4. The second example is designed to adjust the feedback voltage Vfb and output voltage Vout by adjusting the standard voltage Vref0 while at the same time maintaining the reference voltage Vref1 and the resistance ratio between the resistive elements 342 and 344 constant.

More specifically, the standard signal generation unit 346 of a negative power source 304_2 according to the second example includes a combination of standard signal generation units 346_*x* adapted to generate different standard voltages Vref0_x from each other and the switches 348_*x* (where x=1 to 5 in the figure). The standard signal generation units 346_*x* and switches 348_*x* are connected in series. The output voltage control unit 350 includes the control logic 354 adapted to control the switches 348_*x*. Each of the switches 348_*x* is supplied with the switch control signal SW_x at its control input end from the control logic 354.

The control logic 354 controls which of the switches 348_*x* is to be turned on according to the accumulation time (electronic shutter) setting supplied externally. This allows for the standard voltage Vref0 of the standard signal generation unit 346 to be adjusted according to the accumulation time setting, thus adjusting the output voltage Vout according to the accumulation time setting.

That is, the output voltage control unit 350 varies the standard voltage Vref0 according to the accumulation time setting using the standard signal generation units 346_*x* adapted to generate different standard voltages from each other and the switches 348_*x*, thus setting the negative voltage according to the accumulation time setting as illustrated in FIG. 4. As described above, by using a circuit adapted to determine the negative voltage by adjusting the standard voltage Vref0 of the feedback unit 340, it is possible to readily adjust, with a small-scale circuit, the negative voltage level according to the accumulation time setting without adversely affecting the power consumption. Further, this example is applicable regardless of the pixel structure used.

Negative Voltage Adjustment

Third Example

Figure 5B:
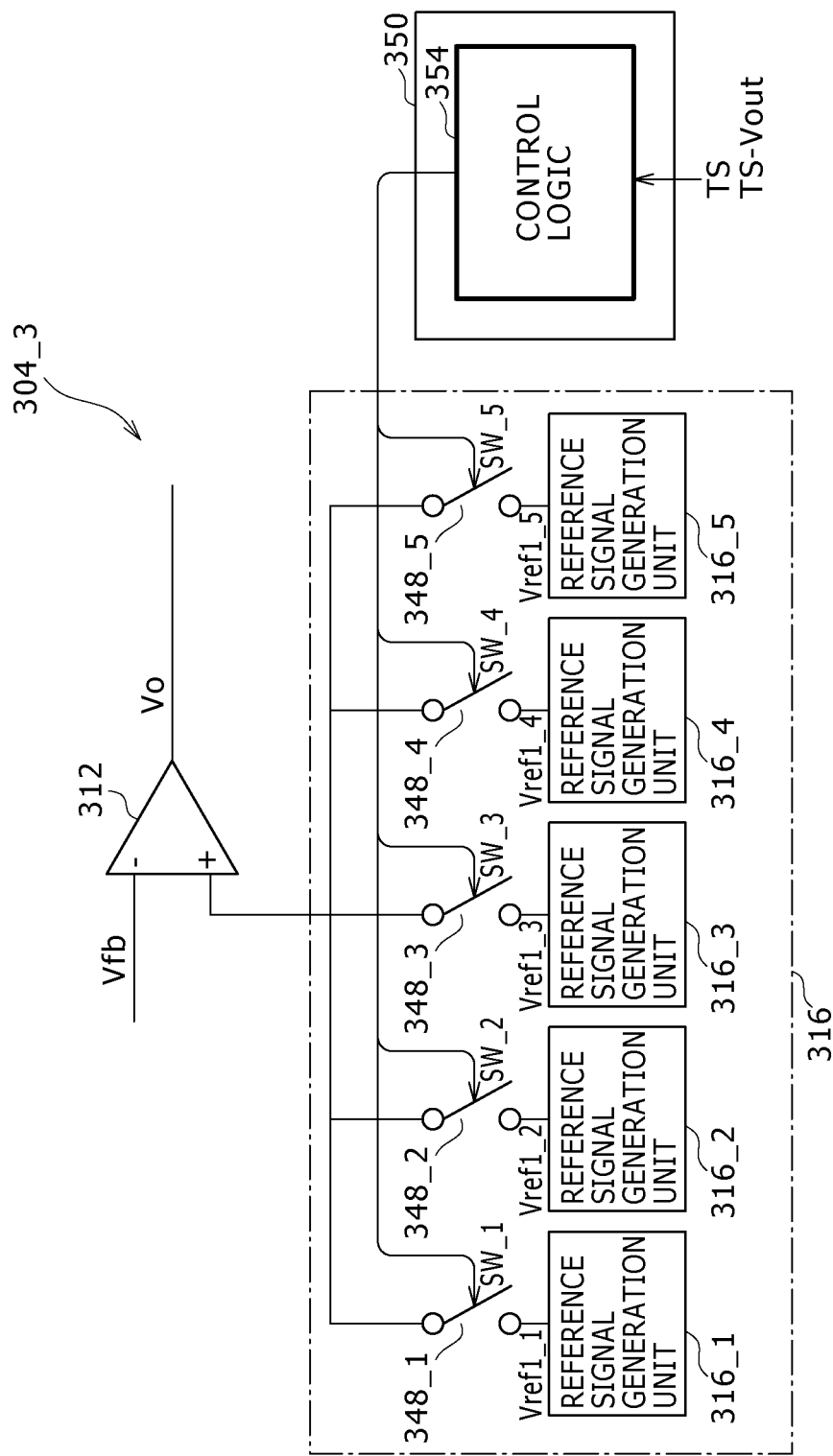
FIG. 5B is a diagram illustrating a circuit configuration according to a third example adapted to permit negative voltage adjustment.

FIG. 5B is a diagram illustrating a circuit configuration of the negative power source 304 according to a third example adapted to permit negative voltage adjustment shown in FIG. 4. The third example is designed to adjust the control voltage Vo by adjusting the reference voltage Vref1 while at the same time maintaining the standard voltage Vref0 and the resistance ratio between the resistive elements 342 and 344 constant, thus adjusting the output voltage Vout.

More specifically, the error amplification unit 310 of a negative power source 304_3 according to the third example includes a combination of reference signal generation units 316_$x$ adapted to generate different reference voltages Vref1_x from each other and the switches 318_$x$ (where x=1 to 5 in the figure). The reference signal generation units 316_$x$ and switches 318_$x$ are connected in series. The output voltage control unit 350 includes the control logic 354 adapted to control the switches 318_$x$. Each of the switches 318_$x$ is supplied with the switch control signal SW_x at its control input end from the control logic 354.

The control logic 354 controls which of the switches 318_$x$ is to be turned on according to the accumulation time (electronic shutter) setting supplied externally. This allows for the reference voltage Vref1 of the reference signal generation unit 316 to be adjusted according to the accumulation time setting, thus adjusting the output voltage Vout according to the accumulation time setting.

That is, the output voltage control unit 350 varies the reference voltage Vref1 according to the accumulation time setting using the reference signal generation units 316_$x$ adapted to generate different reference voltages Vref1_x from each other and the switches 318_$x$, thus setting the negative voltage according to the accumulation time setting as illustrated in FIG. 4. As described above, by using a circuit adapted to determine the negative voltage by adjusting the reference voltage Vref1 of the error amplification unit 310, it is possible to readily adjust, with a small-scale circuit, the negative voltage level according to the accumulation time setting without adversely affecting the power consumption. Further, this example is applicable regardless of the pixel structure used.

It should be noted that although not illustrated, the configuration examples shown in FIGS. 5 to 5B (first to third examples) may be combined as desired.

<Example of Drive Timing>

Figure 6:
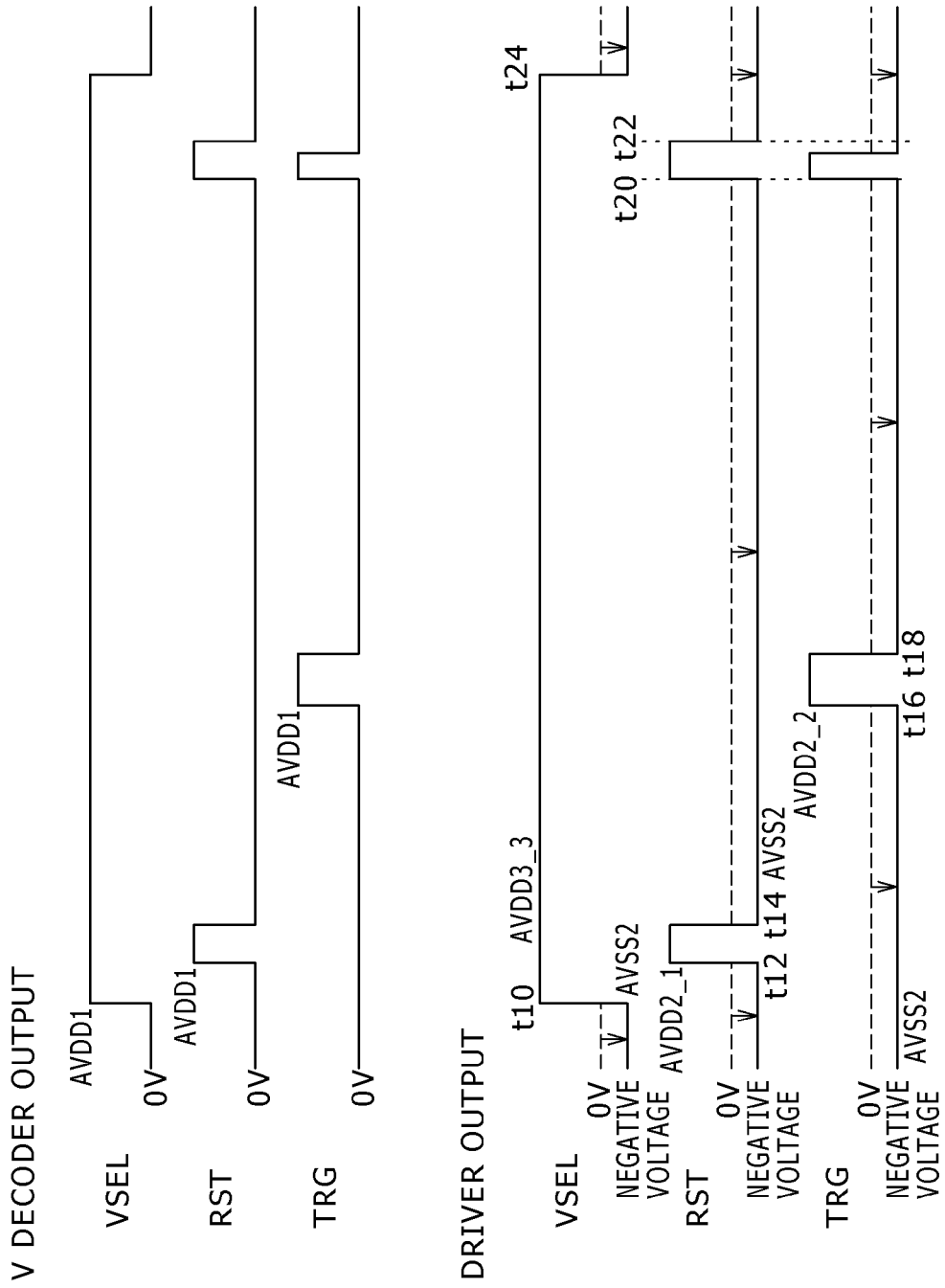
FIG. 6 is a timing diagram illustrating an example of operation timings of control pulses adapted to drive the unit pixel.

FIG. 6 is a timing diagram illustrating an example of operation timings of control pulses adapted to drive the unit pixel 3. The vertical address setting unit 14$a$ changes the vertical selection pulse VSEL for a selected row to the active high level, thus turning on the vertical selection transistor 40 (t10). In this condition, the same unit 14$a$ changes the reset pulse RST to the active high level for a given period, thus turning on the reset transistor 36 (t12 to t14). Then, the same unit 14$a$ changes the transfer pulse TRG to the active high level for a given period, thus turning on the readout selection transistor 34. This causes the signal charge accumulated in the charge generation unit 32 to be transferred to the floating diffusion 38 (t16 to t18).

When this transfer of signal charge is complete, the vertical address setting unit 14$a$ changes the transfer pulse TRG and reset pulse RST to the active high level almost at the same time, thus turning on the readout selection transistor 34 and reset transistor 36. This causes unnecessary charge to be discharged from the charge generation unit 32 (t20 to t22). Then, the same unit 14$a$ changes the vertical selection pulse VSEL for the selected row to the inactive low level and proceeds onto the next row. As a result, the pixel signal voltage Vx of the vertical signal line 19 is set to the reset level Srst for the period of time from t14 to t16. The pixel signal voltage Vx of the vertical signal line 19 is set to the signal level Ssig for the period of time from t18 to t20.

These control pulses TRG, RST and VSEL are fed to the level shifters 146. The level shifters 146 are supplied, as source voltages, with the digital positive voltage DVDDw from the positive power source 302 and the analog negative voltage AVSSw from the negative power source 304. The high and low levels of each of the control pulses TRG, RST and VSEL are shifted respectively to the analog positive voltage AVDDw and analog negative voltage AVSSw, driving the unit pixel 3 via the drivers 148.

Here, the output voltage control unit 350 adjusts the negative output voltage Vout of the negative power source 304 in conjunction with the accumulation time (electronic shutter) setting supplied externally. As a result, the analog negative voltage AVSSw changes according to the accumulation time setting as illustrated in FIG. 4.

For example, it takes 0.1 second for a CMOS image sensor with a frame rate of ten frames/sec to accumulate a frame, and 0.02 seconds for a CMOS image sensor with a frame rate of 50 frames/sec to do the same. Therefore, a long accumulation time of one or two seconds is rare and limited, for example, to image capture in a dark location at night. Therefore, reducing the negative voltage (increasing the value on the minus side) only during this period has almost no impact on the transistor characteristics such as stress on the gate oxide film and degradation of the transistor characteristics due, for example, to hot carriers, thus providing reduced noise (white dots) caused by dark current.

As described above, when a long accumulation time is set, the arrangement according to the first embodiment controls the negative voltage in conjunction with the long accumulation time, thus suppressing noise caused by dark current. Further, only the negative voltage level is controlled according to the accumulation time setting, the circuit scale or current consumption is hardly adversely affected.

Interface between the Pixel Array Unit and Vertical Scan Unit

Second Embodiment

Figure 7:
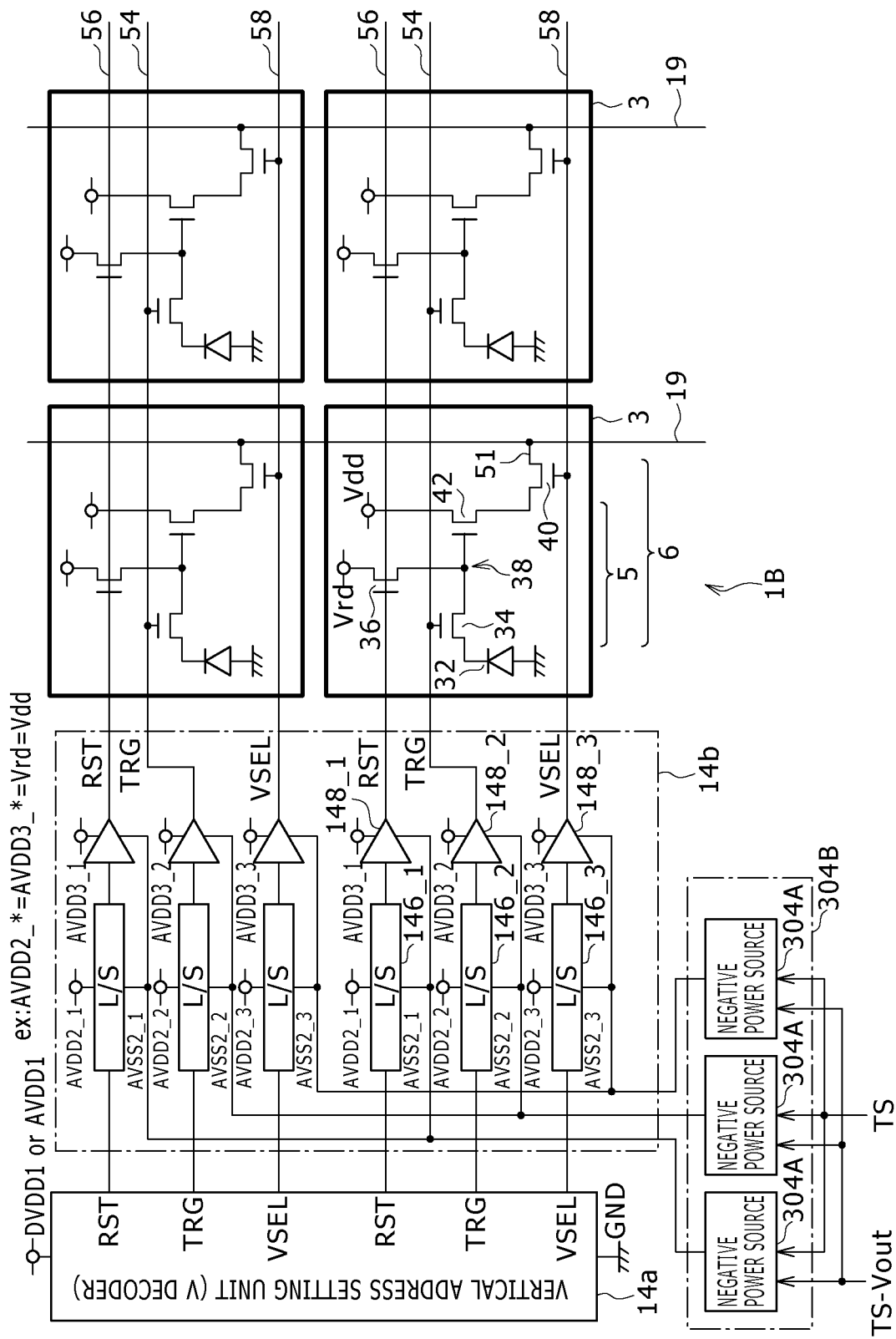
FIG. 7 is a diagram illustrating a solid-state imaging device according to a second embodiment with focus on the interface between the vertical scan unit and pixel array unit.

FIG. 7 is a diagram illustrating a solid-state imaging device 1B according to a second embodiment with focus on the interface between the vertical scan unit 14 and pixel array unit 10.

First, as for the vertical drive unit 14$b$ of the solid-state imaging device 1B according to the second embodiment, the positive voltage side is the same as that according to the first embodiment. In contrast, a negative power source 304B according to the second embodiment includes the negative power source 304A according to the first embodiment for each of the pulses RST, TRG and VSEL. Each of the negative power sources 304A is supplied with accumulation time setting information from an external main control unit so that each of the analog negative voltages AVSS2_k (where k is 1 to 3) is adjusted to a negative voltage level commensurate with the accumulation time setting.

First, as for the negative voltage side, the negative power terminals of the level shifter 146 and driver 148 for each of the reset pulse RST, transfer pulse TRG and vertical selection pulse VSEL are connected together so that the analog negative voltage AVSS2 is supplied. On the other hand, the level shifters 146 and drivers 148 for the pulses RST, TRG and VSEL are supplied with different analog negative voltages AVSS2_1, AVSS2_2 and AVSS2_3. The optimization of the voltage levels by supplying the different negative voltages to the transistors 34, 36 and 42 ensures reduced stress and optimal characteristics.

For example, the readout selection transistor 34, reset transistor 36 and vertical selection transistor 40 making up the unit pixel 3 each have optimal characteristics. As a result, these transistors may differ in gate size (W/L) and threshold voltage Vth. In this case, supplying the same analog negative voltage AVSSw irrespective of which of the pulses RST, TRG and VSEL the level shifters 146 and drivers 148 are used for as in the first embodiment fails to optimize the negative voltage levels for the transistors.

In contrast, supplying different analog negative voltages AVSSw_k, each optimized in negative voltage level for one of the pulses RST, TRG and VSEL, as in the second embodiment, allows for optimization of the negative voltage settings irrespective of the characteristics of the transistors making up the unit pixel 3. This ensures reduced stress and optimal characteristics such as amount of current the transistor leak when they are in the off state for each of the transistors.

Interface between the Pixel Array Unit and Vertical Scan Unit

Third Embodiment

Figure 8:
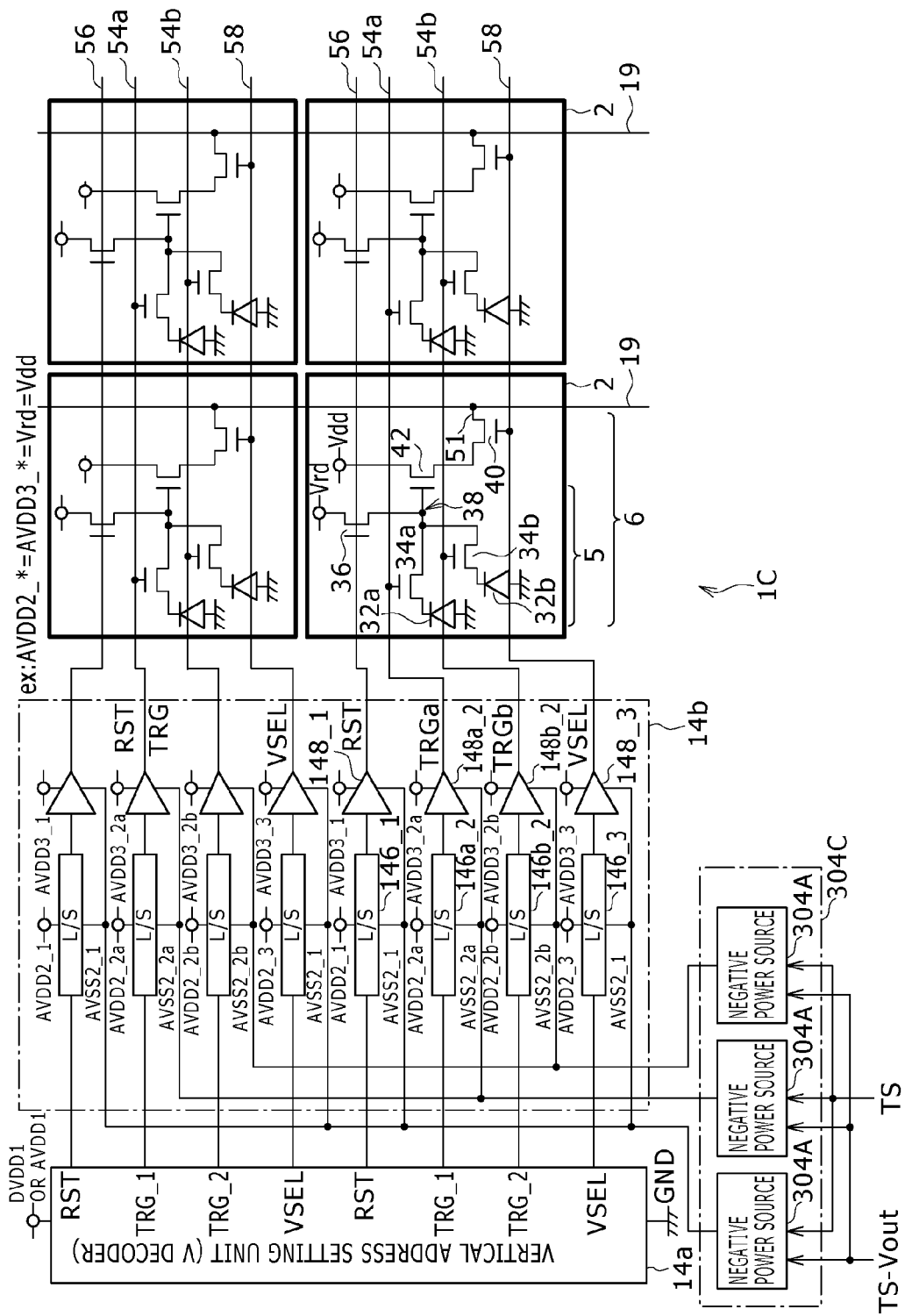
FIG. 8 is a diagram illustrating a solid-state imaging device according to a third embodiment with focus on the interface between the vertical scan unit and pixel array unit.

FIG. 8 is a diagram illustrating a solid-state imaging device 1C according to a third embodiment with focus on the interface between the vertical scan unit 14 and pixel array unit 10. In the third embodiment, the pixel array unit 10 has unit pixel groups 2 arranged in a matrix form. Each of the unit pixel groups 2 has a pixel sharing structure in which some of the components in the unit pixel 3 are shared by the plurality of unit pixels 3.

The unit pixels 3 making up the unit pixel group 2 in the pixel array section 10 are configured in the same manner as in an ordinary CMOS image sensor. Here, a two-pixel sharing structure is shown as an example in which the single unit pixel group 2 is formed from combination of the two unit pixels 3. It should be noted that the configuration of the unit pixels 3 and that of the unit pixel group 2 formed by combining the unit pixels 3 are merely examples. The present embodiment is not limited thereto. For example, in the configuration shown in FIG. 8, the present embodiment is not limited to the unit pixel group 2 made up of the two unit pixels 3. Instead, the same group 2 may be made up of the three, four or eight unit pixels 3.

From the viewpoint of circuit configuration, the unit pixel group 2 has the two charge generation sections 32a, 32b. The same sections 32 share the reset transistor 36, floating diffusion 38 and amplifying transistor 42 except for the readout selection transistor 34. It should be noted that we assume that the pixels sharing the components are adjacent to each other. The pixels may be adjacent vertically, horizontally or both vertically and horizontally (i.e., diagonally) on the screen when the unit pixels 3 are arranged in the form of a square grid. In the present embodiment, we assume that the single unit pixel group 2 is made up of the two unit pixels 3 arranged in the row direction (vertical direction).

In order to serve as means to transfer signal charges Qa and Qb, accumulated respectively in two charge generation sections 32a and 32b, to the common pixel signal generation section 5, the unit pixel group 2 has readout selection transistors 34a and 34b and transfer wirings 54a and 54b which are independent of each other. In contrast, the vertical drive unit 14b has level shifters 146a and 146b and drivers 148a and 148b which are independent of each other. The level shifters 146a and 146b are supplied respectively with transfer pulses TRGa and TRGb from the vertical address setting unit 14a.

A first unit pixel 3a can be viewed as including the charge generation section 32a, readout selection transistor 34a and pixel signal generation section 5, and a second unit pixel 3b the charge generation section 32b, readout selection transistor 34b and pixel signal generation section 5.

Thus, in such a configuration, the unit pixel group 2 includes five transistors as a whole. When viewed in terms of the charge generation sections 32a and 32b, these sections each have a four-transistor configuration in which the unit pixel 3 includes four transistors.

It should be noted that, when used for color imaging, the unit pixels 3 sharing the components are not limited to pixels of the same color. Instead, the unit pixels of a plurality of colors may share a charge/voltage conversion unit (pixel signal generation unit 5) having an FDA configuration. Alternatively, the unit pixels of the same color may share the charge/voltage conversion unit (pixel signal generation unit 5).

First, as for the vertical drive unit 14b of the solid-state imaging device 1C according to the third embodiment, the positive voltage side is the same as that according to the first embodiment. In contrast, a negative power source 304C according to the third embodiment includes the three negative power sources 304A according to the first embodiment, one for the reset pulse RST and vertical selection pulse VSEL, one for the transfer pulse TRGa and one for the transfer pulse TRGb. Each of the negative power sources 304A is supplied with accumulation time setting information from an external main control unit so that each of the analog negative voltages AVSS2_k* (where k is 1 to 3 and * is "a" or "b" when k=2) is adjusted to a negative voltage level commensurate with the accumulation time setting.

First, as for the negative voltage side, the negative power terminals of the level shifter 146 and driver 148 for each of the reset pulse RST, transfer pulse TRGa, transfer pulse TRGb and vertical selection pulse VSEL are connected together so that the analog negative voltage AVSS2 is supplied. Further, the level shifters 146 and drivers 148 for the reset pulse RST and vertical selection pulse VSEL are supplied with the same analog negative voltage AVSS2_1. On the other hand, the level shifters 146 and drivers 148 for the transfer pulse TRGa and transfer pulse TRGb are supplied with different analog negative voltages AVSS2_2a and AVSS2_2b. At least transistors 34a and 34b are supplied with different negative voltages, thus ensuring optimal voltage levels.

If the floating diffusion 38 is shared by the plurality of charge generation units 32 in the unit pixel group 2 as illustrated in FIG. 8, there is a difference in arrangement of the floating diffusion 38 between an R-Gr row in which red and green pixels are arranged and a B-Gb row in which blue and green pixels are arranged. Therefore, the charge generation units 32 and the readout selection transistors 34 (transfer gates) differ in shape and arrangement between different rows. This difference in shape and orientation leads to a difference in dark current characteristic. As a result, the optimization of the voltage levels by supplying the different negative voltages in different rows ensures reduced difference in dark current. As described above, if the floating diffusion 38 is shared by the plurality of charge generation units 32, supplying different negative voltages in different rows ensures reduced difference in dark current caused by the difference in shape and arrangement. It is possible to optimize the negative voltage settings irrespective of the shape and arrangement of the transistors making up the unit pixel group 2.

It should be noted that, although not illustrated, the different analog negative voltages AVSS2_1, AVSS2_2a, AVSS2_2b and AVSS2_3 may be supplied respectively for the pulses RST, TRGa, TRGb and VSEL. Supplying the different analog negative voltages AVSS2_k, each optimized in negative voltage level for one of the pulses RST, TRGa, TRGb and VSEL, allows for optimization of the negative voltage settings irrespective of the shape, arrangement and characteristics of the transistors making up the unit pixel group 2.

Interface between the Pixel Array Unit and Vertical Scan Unit

Fourth Embodiment

Figure 9:
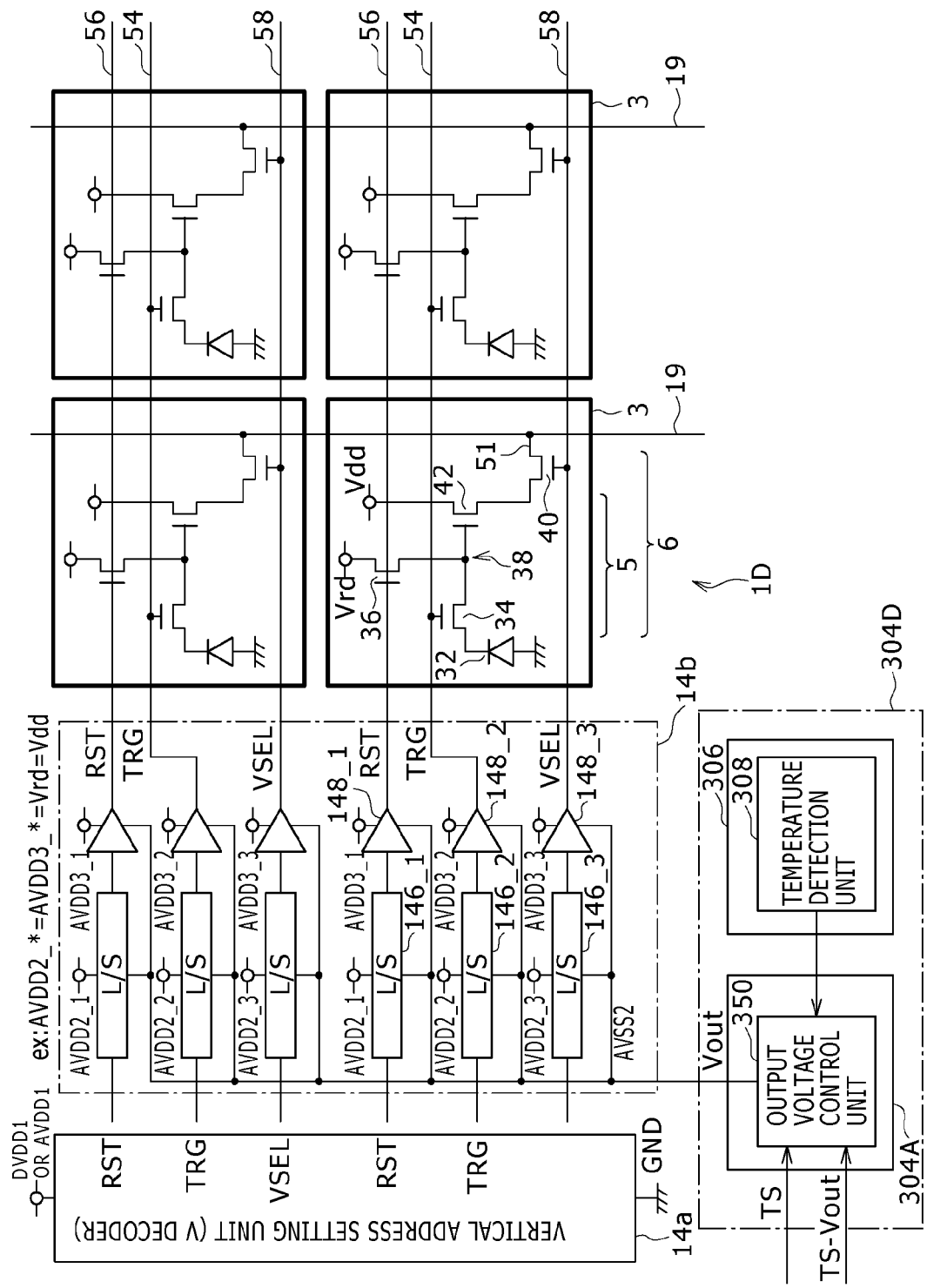
FIG. 9 is a diagram illustrating a solid-state imaging device according to a fourth embodiment with focus on the interface between the vertical scan unit and pixel array unit.
Figure 10:
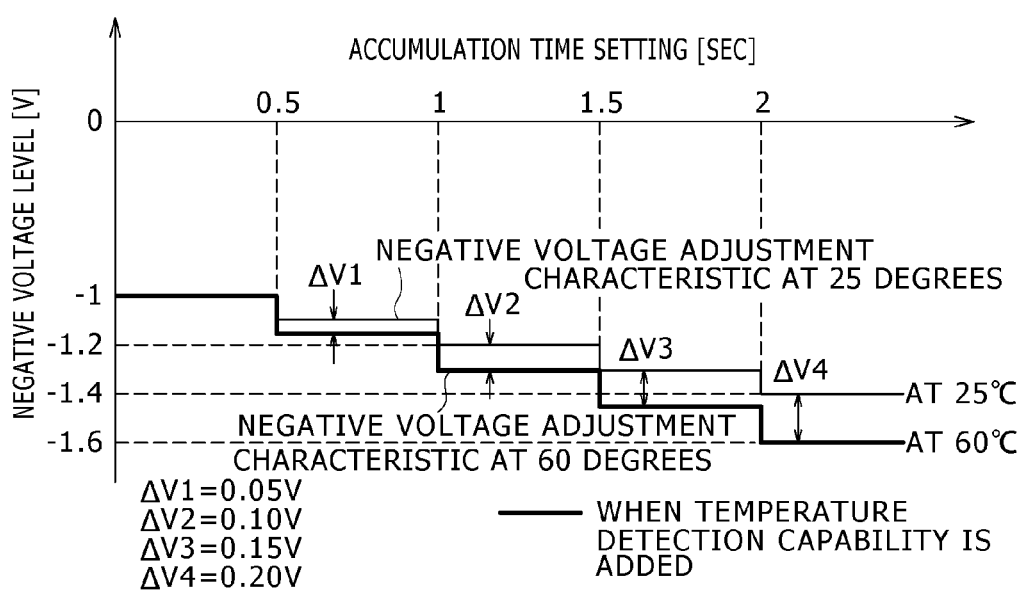
FIG. 10 are diagrams describing examples of adjustment of the negative output voltage Vout (commensurate with the digital negative voltage DVSSw) output from the negative power source according to the fourth embodiment.

FIGS. 9 and 10 are diagrams describing a solid-state imaging device 1D according to a fourth embodiment. Here, FIG. 9 is a diagram illustrating the solid-state imaging device 1D according to the fourth embodiment with focus on the interface between the vertical scan unit 14 and pixel array unit 10. Although a modification example of the first embodiment is shown, the fourth embodiment is also applicable to the second and third embodiments. FIG. 10 is a diagram describing an example of adjustment of the output voltage Vout (commensurate with the analog negative voltage AVSSw) output from a negative power source 304D according to the fourth embodiment.

The fourth embodiment is designed to automatically adjust the analog negative voltage AVSSw according to the environmental conditions (e.g., temperature and humidity). Therefore, the negative power source 304D according to the fourth embodiment includes an environmental condition detection unit 306 in addition to the negative power source 304A according to the first embodiment. The environmental condition detection unit 306 has, as an example, a temperature detection unit 308 adapted to detect the ambient temperature of the solid-state imaging device 1.

In the present embodiment, the temperature detection unit 308 has an unshown temperature sensor and uses this temperature sensor to detect the temperature of the desired position in the device. As an example, the temperature sensor should be arranged to detect the temperature near the pixel array unit 10 so as to detect the ambient temperature of the transistors making up the unit pixel 3. As a temperature sensor, an electronic sensor should preferably be used that includes, for example, a platinum resistance thermometer, thermistor or thermocouple. Alternatively, a non-contact temperature sensor may be used that measures infrared radiation emitted from a substance and measures the temperature of the substance based on the amount of infrared radiation.

The temperature detection result of the temperature detection unit 308 is supplied to the output voltage control unit 350 of the negative power source 304A. The output voltage control unit 350 adjusts the output voltage Vout not only based on the accumulation time setting TS but also based on the temperature detected by the temperature detection unit 308 so that the higher the ambient temperature, the higher the output voltage Vout.

Dark current tends to increase with increase in temperature. For this reason, the environmental condition detection unit 306 (temperature detection unit 308) having a temperature detection function is provided in the negative power source 304D as illustrated in FIG. 9, thus reducing the negative voltage levels at high temperatures and providing improvement against noise (white dots) caused by dark current. Adding a temperature detection function to the negative power source ensures reduced white dots at high temperatures.

For example, when the charge accumulation time is 0.5 seconds or more as illustrated in FIG. 10, the negative voltage level is further increased by $\Delta y$ (where y is 1 to 4) as compared to the negative voltage adjustment characteristic at 25° C. (same as that shown in FIG. 4(1)). At this time, the longer the accumulation time, the larger $\Delta y$ is set in the present example. As a result, the longer the accumulation time, and the higher the ambient temperature, the higher the negative voltage level synergistically becomes.

For example, $\Delta y$ is set to 0.05×y. In this case, the output voltage Vout (negative voltage level) of the output terminal 304out relative to the accumulation time setting TS is $-1.0$ V when $0 \text{ sec} \leq TS < 0.5 \text{ sec}$, $-1.1$ V$-\Delta 1 = -1.15$ V when $0.5 \text{ sec} \leq TS < 1.0 \text{ sec}$, $-1.2$ V$-\Delta 2 = -1.3$ V when $1.0 \text{ sec} \leq TS < 1.5 \text{ sec}$, $-1.3$ V$-\Delta 3 = -1.45$ V when $1.5 \text{ sec} \leq TS < 2 \text{ sec}$, and $-1.4$ V$-\Delta 4 = -1.6$ V when $2.0 \text{ sec} \leq TS$. Thus, the longer the accumulation time, or the higher the ambient temperature, the higher the negative voltage. It should be noted that, in the present example, it is necessary to be able to adjust the negative voltage level in eight steps as a whole for the voltage level settings at 25 and 60 degrees.

Imaging Device

Fifth Embodiment

Figure 11:
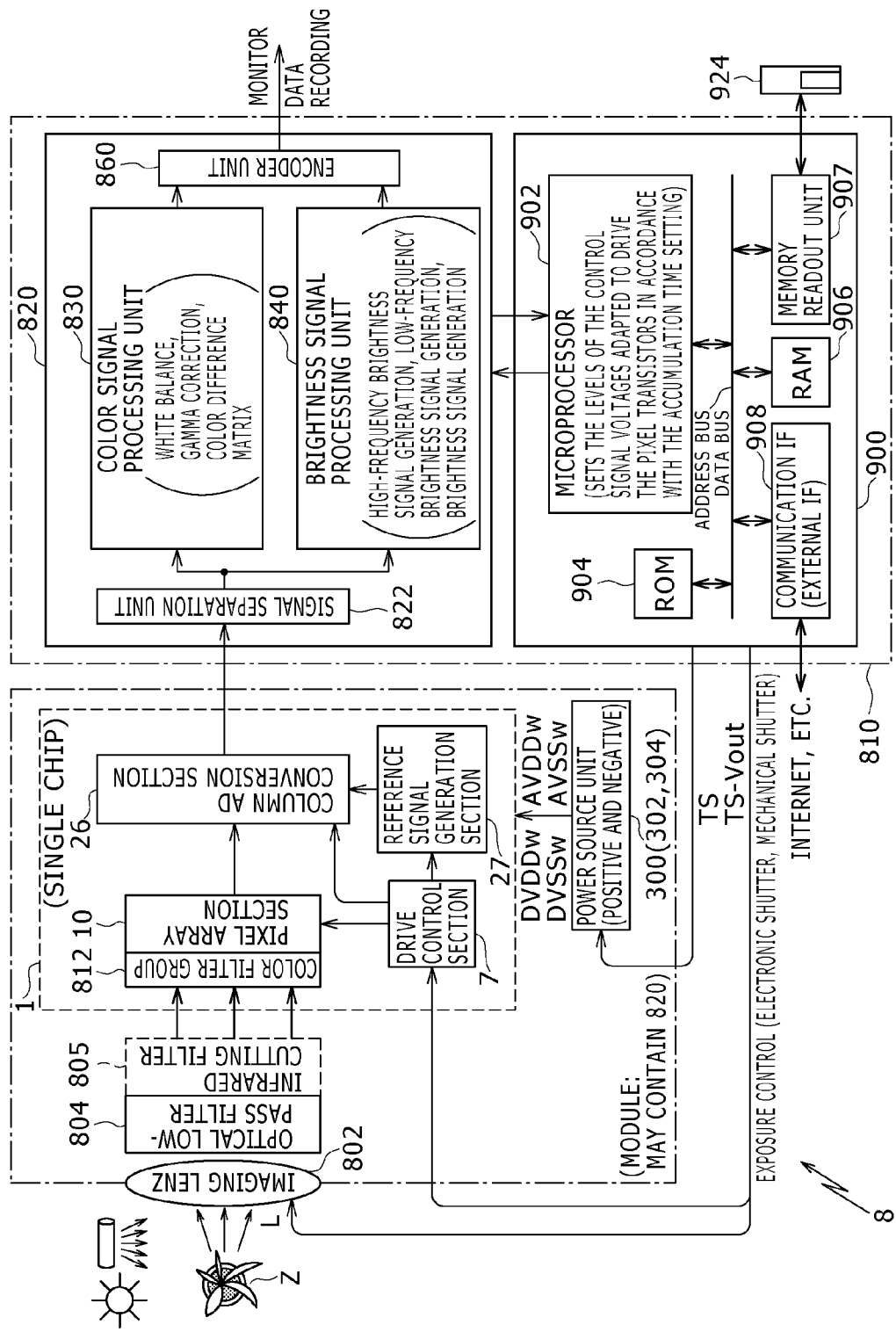
FIG. 11 is a schematic configuration diagram of an imaging device (a fifth embodiment).

FIG. 11 is a diagram describing a fifth embodiment. The fifth embodiment is an application of the arrangement for negative voltage adjustment, used in the above embodiments of the solid-state imaging device 1, to an imaging device which is an example of physical information acquisition device. FIG. 11 is a schematic configuration diagram of an imaging device 8.

Even as an imaging device, if, of low and high level sides of each of the control signals adapted to drive one of the transistors of the signal output unit 6, the voltage level of the side commensurate with the signal charge or transistor polarity is adjusted so that the longer the signal charge accumulation time, the higher the voltage level, it is possible to implement an arrangement for reducing dark current. At this time, for example, at least control relating to the voltage level settings of the control signals such as charge accumulation time setting information can be specified as desired by setting control instruction information in the communication/timing control unit 20.

More specifically, the imaging device 8 includes an imaging lens 802, optical low-pass filter 804, a color filter group 812, the pixel array section 10, drive control section 7, column AD conversion section 26, reference signal generation section 27 and a camera signal processing block 810. As shown by a dashed line in the figure, an infrared cutting filter 805 may be provided together with the optical low-pass filter 804. The same filter 805 is designed to reduce the infrared component.

Further, a power source section 300 including positive and negative power sources 302 and 304 is provided in the present embodiment separately from the semiconductor region (semiconductor chip) in which the pixel array section 10, drive control section 7, column AD conversion section 26 and reference signal generation section 27 are formed.

The imaging lens 802 forms an image by guiding light L carrying the image of a subject Z under illumination, for example, with fluorescent light or sunlight, into the imaging device. The color filter group 812 has, for example, R, G and B color filters arranged in a Bayer pattern. The drive control section 7 drives the pixel array section 10. The readout current control section 24 controls the pixel signal operating current from the pixel array section 10. The column AD conversion section 26 handles CDS processing and AD conversion of the pixel signal from the pixel array section 10. The reference signal generation section 27 supplies the reference signal SLP_ADC to the column AD conversion section 26. The camera signal processing block 810 processes the imaging signal from the column AD conversion section 26.

The camera signal processing block 810 provided at the subsequent stage of the column AD conversion section 26 includes an imaging signal processing section 820 and camera control section 900. The same section 900 serves as a main control section adapted to control the imaging device 8 as a whole. The imaging signal processing section 820 includes a signal separation unit 822, color signal processing unit 830, brightness signal processing unit 840 and encoder unit 860.

The signal separation unit 822 has a primary color separation function adapted to separate the digital imaging signal from the AD conversion function section of the column AD conversion section 26 into R (red), G (green) and B (blue) primary color signals when non-primary color filters are used as color filters. The color signal processing unit 830 processes a color signal C based on the primary color signals R, G and B separated by the signal separation unit 822. The brightness signal processing unit 840 processes a brightness signal Y based on the primary color signals R, G and B separated by the signal separation unit 822. The encoder unit 860 generates a video signal VD based on the brightness signal Y and color signal C.

The color signal processing unit 830 includes, for example, a white balance amplifier, gamma correction section and color difference matrix section although the illustration thereof is omitted. The brightness signal processing unit 840 includes, for example, high- and low-frequency brightness signal generation sections and a brightness signal generation section although the illustration thereof is omitted. The high-frequency brightness signal generation section generates a brightness signal YH based on the primary color signals from a primary color separation section of the signal separation unit 822. The brightness signal YH contains some components relatively high in frequency. The low-frequency brightness signal generation section generates a brightness signal YL based on the white-balance-adjusted primary color signals from the white balance amplifier. The brightness signal YL contains only the components relatively low in frequency. The brightness signal generation section generates a brightness signal Y based on the two brightness signals YH and YL and supplies the same signal Y to the encoder unit 860. The brightness signal YL is also used for exposure control.

The encoder unit 860 digitally modulates color difference signals R-Y and B-Y with a digital signal associated with a color signal subcarrier first and then synthesizes the resultant signal and the brightness signal Y generated by the brightness signal processing unit 840 for conversion into the digital video signal VD (=Y+S+C; S is a synchronizing signal, and C a chroma signal). The digital video signal VD from the encoder unit 860 is supplied to the camera signal output section, provided at a further subsequent stage, whose illustration is omitted, for monitor output and data recording to a recording medium. At this time, the digital video signal VD is converted, as necessary, to an analog video signal by DA conversion.

The camera control section 900 according to the present embodiment includes a microprocessor 902, ROM (Read Only Memory) 904 which is a read-only storage section, RAM (Random Access Memory) 906 and other peripheral members whose illustration is omitted. The microprocessor 902 is similar to the one playing a core role in a computer and is typically a CPU (Central Processing Unit) achieved by consolidating arithmetic and control functions handled by a computer into ultra-small integrated circuits. The RAM 906 is an example of volatile storage section which is rewritable and readable at any time. The microprocessor 902, ROM 904 and RAM 906 are also collectively referred to as a microcomputer.

The camera control unit 900 controls the system as a whole. Particularly in the present embodiment, the same unit 900 is capable of setting the voltage levels of the control signals adapted to drive the pixel transistors in conjunction with the charge accumulation time setting. In relation to this capability, the camera control unit 900 supplies the power source unit 300 with the accumulation time setting TS adapted to adjust the source voltage level output from the power source unit 300 (positive power source 302 and negative power source 304) so as to adjust the voltage levels of the control signals adapted to drive the pixel array unit 10. The ROM 904 stores programs such as the control program for the camera control unit 900. Particularly in the present example, the ROM 904 stores a program adapted to control the setting of the voltage levels of the control signals adapted to drive the pixel transistors in conjunction with the charge accumulation time setting. The RAM 906 stores data required for the camera control unit 900 to handle various types of processing.

Further, the camera control section 900 is configured to permit attachment and detachment of a recording medium 924 such as memory card and to permit connection to a communication network such as the Internet. For example, the camera control section 900 includes a memory readout unit 907 and communication I/F (interface) 908 in addition to the microprocessor 902, ROM 904 and RAM 906.

The recording medium 924 is used, for example, to store a wide range of data, including program data to be processed by the microprocessor 902 with software, convergence range of photometric data DL based on the brightness signals from the brightness signal processing unit 840, and settings of various control information for exposure control processing (including electronic shutter control). For example, the recording medium 924 stores the voltage setting information TS-Vout indicating the relationship between the accumulation time setting TS and the output voltages Vout of the positive and negative power sources 302 and 304 (DVDDw, DVSSw, AVDDw and AVSSw) as illustrated in FIG. 4.

The memory readout unit 907 stores (installs) the data read out from the recording medium 924 to the RAM 906. The communication I/F 908 mediates the exchange of communication data with the Internet or other communication network.

The imaging device 8 is shown to be in a modular form having the drive control section 7 and column AD conversion section 26 separately from the pixel array section 10. It is needless to say, however, that the solid-state imaging device 1 having the drive control section 7 and column AD conversion section 26 formed integrally with the pixel array section 10 on the same semiconductor substrate may be used, as described in relation to the same device 1. Further, the imaging device 8 is shown in FIG. 11 to include an optical system such as the imaging lens 802, optical low-pass filter 804 or infrared cutting filter 805, in addition to the pixel array section 10, drive control section 7, column AD conversion section 26, reference signal generation section 27 and camera signal processing block 810. This embodiment is preferred when the imaging device 8 is used as an imaging-capable module having the above components packaged together therein.

Here, as for the relationship between the solid-state imaging device 1 and module, the same device 1 may be provided in the form of an imaging-capable module. This module has, as illustrated in the figure, the pixel array section 10 (imaging section) packaged together with the signal processing section (excluding the camera signal processing block at the subsequent stage of the column AD conversion section 26) such as the column AD conversion section 26 having the AD conversion and difference (CDS) processing functions which is closely related to the pixel array section 10. Then, the camera signal processing block 810, which is the remaining signal processing section, is provided at the subsequent stage of the solid-state imaging device 1 provided in the form of a module. The solid-state imaging device 1 and camera signal processing block 810 together make up the imaging device 8 as a whole.

Alternatively, although not illustrated, the solid-state imaging device 1 may be provided in the form of an imaging-capable module having the pixel array section 10 packaged together with the optical system such as the imaging lens 802. Then, the camera signal processing block 810 is also provided in the module so that the same section 810 and solid-state imaging device 1 together make up the imaging device 8 as a whole. Still alternatively, the module of the solid-state imaging device 1 may include the camera signal processing block 810. In this case, the solid-state imaging device 1 can be substantially considered the same thing as the imaging device 8. The same device 8 is provided, for example, as a camera-equipped or imaging-capable mobile equipment adapted to perform "imaging." It should be noted that the term "imaging" includes not only image capture during normal camera photography but also, in a board sense, fingerprint detection and others.

The imaging device 8 configured as described above includes all the functions of the solid-state imaging device 1 and can be basically configured and operate in the same manner as the solid-state imaging device 1. The shutter time determined by exposure control processing is commensurate with the charge accumulation time. Therefore, the camera control unit 900 notifies the power source unit 300 of the setting information (accumulation time setting TS) and voltage setting information TS-Vout. The positive power source 302 adjusts the digital positive voltage DVDDw or analog positive voltage AVDDw based on the accumulation time setting TS and voltage setting information TS-Vout supplied from the camera control unit 900 so that the longer the accumulation time, the higher the voltage level, thus ensuring reduced dark current. The negative power source 304 adjusts the digital negative voltage DVSSw or analog negative voltage AVSSw based on the accumulation time setting TS and voltage setting information TS-Vout supplied from the camera control unit 900 so that the longer the accumulation time, the higher the voltage level, thus ensuring reduced dark current.

Although the preferred embodiments have been described above, the technical scope of the present invention is not limited to the scope described in these embodiments. The present invention may be changed or modified in various ways without departing from the scope and spirit of the present invention, and embodiments including such changes or modifications are also included in the technical scope of the present invention.

Further, the above embodiments are not limiting the invention as set forth in the appended claims, and not all combinations of the features described in the embodiments constitute essential solving means of the invention. The above embodiments include various stages of the invention, and various inventions can be extracted by an appropriate combination of a plurality of disclosed constituting elements. Even if some of the constituting elements are removed from all the elements, the configuration devoid of such constituting elements can be still extracted as an invention so long as it provides the advantageous effects of the invention.

For example, a description has been given in a pixel with the signal output section 6 having four transistors (34, 36, 40 and 42). However, the same functions and advantageous effects as described in the embodiment can be achieved for the pixels having a three-transistor configuration devoid of the vertical selection transistor 40. Even in this case, the arrangement according to the third embodiment is similarly applicable to those pixels that operate on the same principle, each having one photodiode (charge generation unit 32) and one readout selection transistor 34 and sharing the single reset transistor 36 and single amplifying transistor 42.

Further, in the above embodiments, the description has been given taking, as an example, a sensor including unit pixels, each of which is made up of NMOS transistors. However, the present invention is not limited thereto. The present invention provides the same functions and advantageous effects as described in the above embodiments by reversing the relationship in control signal potentials (reversing the positive and negative potentials) according to the signal charges and transistor polarities.

That is, PMOS transistors, opposite in conductivity type to NMOS transistors used in the above embodiments, are employed for at least the readout selection transistors 34 in a MOS solid-state imaging device using holes as signal charges. Therefore, when charge is accumulated in the charge generation unit 32, it is only necessary to make a modification so that a positive voltage, that is raised higher than the positive voltage serving as the gate voltage of the p-channel readout selection transistor 34, i.e., the positive source voltage that is the standard voltage in this case, is applied. Even in this case, the positive voltage level is adjusted in response to the accumulation time so that the longer the accumulation time, the higher the positive voltage level. On the other hand, during no image capture when signal charge is not accumulated, the positive voltage level need only be low. It is not necessary to have a positive level. For example, therefore, the positive voltage level may be set to the standard voltage (positive source voltage in the present example).

Further, as for the configuration of the unit pixel 3, the substrate and semiconductor region may all be changed to an opposite conductivity type with the condition shown in the embodiments remaining unchanged. Also in this case, a modification need only be made, as necessary, so that the signal charges and the relationship in control signal potentials (the positive and negative potentials) are reversed.

The invention claimed is:

1. A solid-state imaging device comprising unit pixels, each of the unit pixels including:
    a charge generation unit adapted to generate a signal charge; and
    a signal output unit having transistors and adapted to generate and output a target signal commensurate with the signal charge generated by the charge generation unit, wherein,
        of low and high level sides of a control signal adapted to pulse-drive each of the transistors of the signal output unit, the voltage level of the side to be adjusted that is commensurate with the signal charge or transistor polarity is adjusted so that the longer the signal charge accumulation time, the higher the voltage level.
2. The solid-state imaging device of claim 1, wherein:
    the signal output unit has a plurality of transistors serving different functions, and the voltage level of the side to be adjusted is set to a level commensurate with the accumulation time separately for each of the transistors.

3. The solid-state imaging device of claim 1, wherein:
the signal output unit has a plurality of transistors serving different functions,
some of the transistors are shared by the unit pixels,
as for those transistors not shared by the unit pixels, a transistor is provided for each of the unit pixels, and
as for those transistors serving the same function and not shared by the unit pixels, the voltage level of the side to be adjusted is set to a level commensurate with the accumulation time.

4. The solid-state imaging device of claim 1, wherein the higher the ambient temperature, the higher the voltage level of the side to be adjusted.

5. The solid-state imaging device of claim 1 comprising:
a power source unit adapted to output source voltages; and
a drive unit adapted to supply the transistors with the control signals whose magnitudes are commensurate with the source voltages supplied from the power source unit, wherein,
the drive unit and power source unit are formed integrally in a semiconductor region where the charge generation unit and signal output unit are provided, and
the power source unit adjusts the source voltage of the side to be adjusted based on the signal charge accumulation time.

6. The solid-state imaging device of claim 5, wherein:
the signal output unit has a plurality of transistors serving different functions, and
the power source unit adjusts the source voltage of the side to be adjusted to a level commensurate with the accumulation time separately for each of the transistors.

7. The solid-state imaging device of claim 5, wherein:
the signal output unit has a plurality of transistors serving different functions,
some of the transistors are shared by the unit pixels,
as for those transistors not shared by the unit pixels, a transistor is provided for each of the unit pixels, and
the power source unit adjusts the source voltage of the side to be adjusted of each of the transistors serving the same function and not shared by the unit pixels to a level commensurate with the accumulation time.

8. The solid-state imaging device of claim 5, wherein
the power source unit has a temperature detection unit adapted to detect the ambient temperature of the transistors and adjusts the source voltage of the side to be adjusted based on the temperature detected by the temperature detection unit so that the higher the ambient temperature, the higher the voltage level of the side to be adjusted.

9. The solid-state imaging device of claim 5, wherein the power source unit can change the relationship between the signal charge accumulation time and the source voltage of the side to be adjusted.

10. The solid-state imaging device of claim 5, wherein the power source unit comprises:
an error amplification unit adapted to amplify the difference between a reference signal and feedback signal;
a source voltage generation unit adapted to generate a source voltage of the side to be adjusted based on the output of the error amplification unit;
a feedback unit adapted to notify the error amplification unit of the feedback signal commensurate with the output voltage generated by the source voltage generation unit; and an output voltage control unit adapted to control the magnitude of the source voltage generated by the source voltage generation unit,
wherein, the feedback unit includes
(a) a standard signal generation unit adapted to generate a standard signal,
(b) a first resistive element having one end connected to an output end of the source voltage, and
(c) a second resistive element having one end connected to the other end of the first resistive element and the other end connected to an output end of the standard signal of the standard signal generation unit.

11. The solid-state imaging device of claim 10, wherein:
the second resistive element comprises a combination of resistive elements and switches, and
the output voltage control unit controls the on/off operations of the switches according to the accumulation time.

12. The solid-state imaging device of claim 10, wherein:
the standard signal generation unit comprises a combination of standard signal generation units adapted to generate different standard signals and switches, and
the output voltage control unit controls the on/off operations of the switches according to the accumulation time.

13. The solid-state imaging device of claim 10, wherein:
the error amplification unit comprises a combination of reference signal generation units adapted to generate different reference signals and switches, and
the output voltage control unit controls the on/off operations of the switches according to the accumulation time.

14. The solid-state imaging device of claim 5, wherein during no image capture, the power source unit sets, of low and high level sides of the control signal, the source voltage level of the side commensurate with the signal charge or transistor polarity to a standard potential.

15. An imaging device comprising:
a pixel array unit having unit pixels arranged two-dimensionally in a matrix form, each of the unit pixels including (a) a charge generation unit adapted to generate a signal charge, and (b) a signal output unit having transistors and adapted to generate and output a target signal commensurate with the signal charge generated by the charge generation unit;
a power source unit adapted to output source voltages;
a drive unit adapted to supply the transistors with control signals whose magnitudes are commensurate with the source voltages supplied from the power source unit and adapted to pulse-drive the transistors of the signal output unit; and
a main control unit adapted to control the drive unit and power source unit, wherein,
the main control unit not only drives the drive unit to adjust an accumulation time of the signal charge but also notifies the power source unit of information about the accumulation time, and
the power source unit adjusts, of low and high level sides of the control signal, the source voltage level of the side to be adjusted that is commensurate with the signal charge or transistor polarity based on the information about the accumulation time supplied from the main control unit so that the longer the signal charge accumulation time, the higher the voltage level.

16. A pixel driving method of unit pixels, each of the unit pixels including (a) a charge generation unit adapted to generate a signal charge, and (b) a signal output unit having transistors and adapted to generate and output a target signal commensurate with the signal charge generated by the charge generation unit, the pixel driving method comprising:

adjusting, of low and high level sides of a control signal adapted to pulse-drive each of the transistors of the signal output unit, the voltage level of the side commensurate with the signal charge or transistor polarity so that the longer the signal charge accumulation time, the higher the voltage level.

* * * * *